(12) United States Patent
Takahashi

(10) Patent No.: US 8,941,879 B2
(45) Date of Patent: Jan. 27, 2015

(54) INPUT DISPLAY APPARATUS, CONTROL METHOD THEREOF AND STORAGE MEDIUM

(71) Applicant: Canon Kabushiki Kaisha, Tokyo (JP)

(72) Inventor: Katsuyuki Takahashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/712,884

(22) Filed: Dec. 12, 2012

(65) Prior Publication Data

US 2013/0169981 A1 Jul. 4, 2013

(30) Foreign Application Priority Data

Dec. 28, 2011 (JP) ................... 2011-289894

(51) Int. Cl.
*G06F 3/0488* (2013.01)
*G06F 3/12* (2006.01)

(52) U.S. Cl.
CPC ............ *G06F 3/0488* (2013.01); *G06F 3/1256* (2013.01); *G06F 3/1253* (2013.01); *G06F 3/1205* (2013.01); *G06F 3/1292* (2013.01)
USPC ........................................... 358/1.4; 358/468

(58) Field of Classification Search
USPC ................... 358/1.9, 2.1, 1.4, 406, 504, 468; 73/488, 489, 494, 496, 1.38, 1.41
See application file for complete search history.

(56) References Cited

U.S. PATENT DOCUMENTS

| 6,520,013 B1 | 2/2003 | Wehrenberg |
| 6,788,434 B1 | 9/2004 | Kanematsu et al. |
| 2010/0231962 A1 | 9/2010 | Sakai et al. |
| 2012/0008159 A1 | 1/2012 | Takahashi et al. |

FOREIGN PATENT DOCUMENTS

JP        2011-54177 A    3/2011

*Primary Examiner* — Thomas D Lee
*Assistant Examiner* — Stephen M Brinich
(74) *Attorney, Agent, or Firm* — Fitzpatrick, Cella, Harper & Scinto

(57) ABSTRACT

An input display apparatus can communicate with a printing apparatus, and includes a display unit, a touch detection unit, and an orientation detection unit. The input display apparatus determines which screen components is touched by the operator touches, determines a type of an operation from the touch by the operator, and determines based on the orientation of the input display apparatus whether or not the input display apparatus has been rotated on a plane including a display screen. When the operation is a long press operation, and the input display apparatus has been rotated, the touched screen component determined to be touched is rotated and displayed in a direction opposite to a rotation direction of the input display apparatus.

18 Claims, 14 Drawing Sheets

FIG. 6
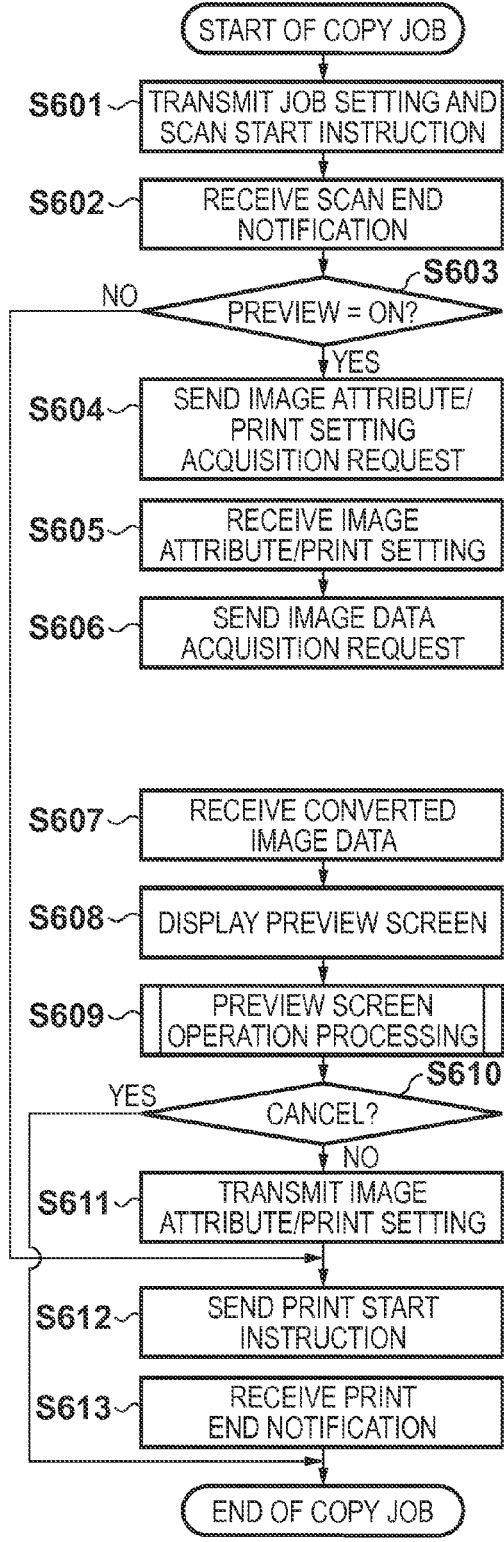
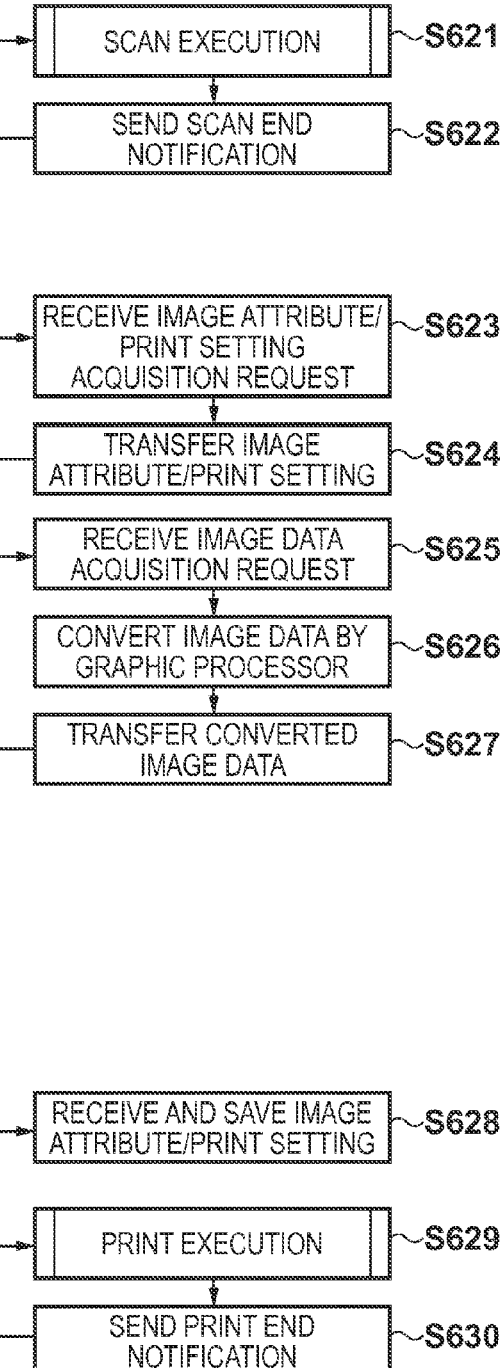

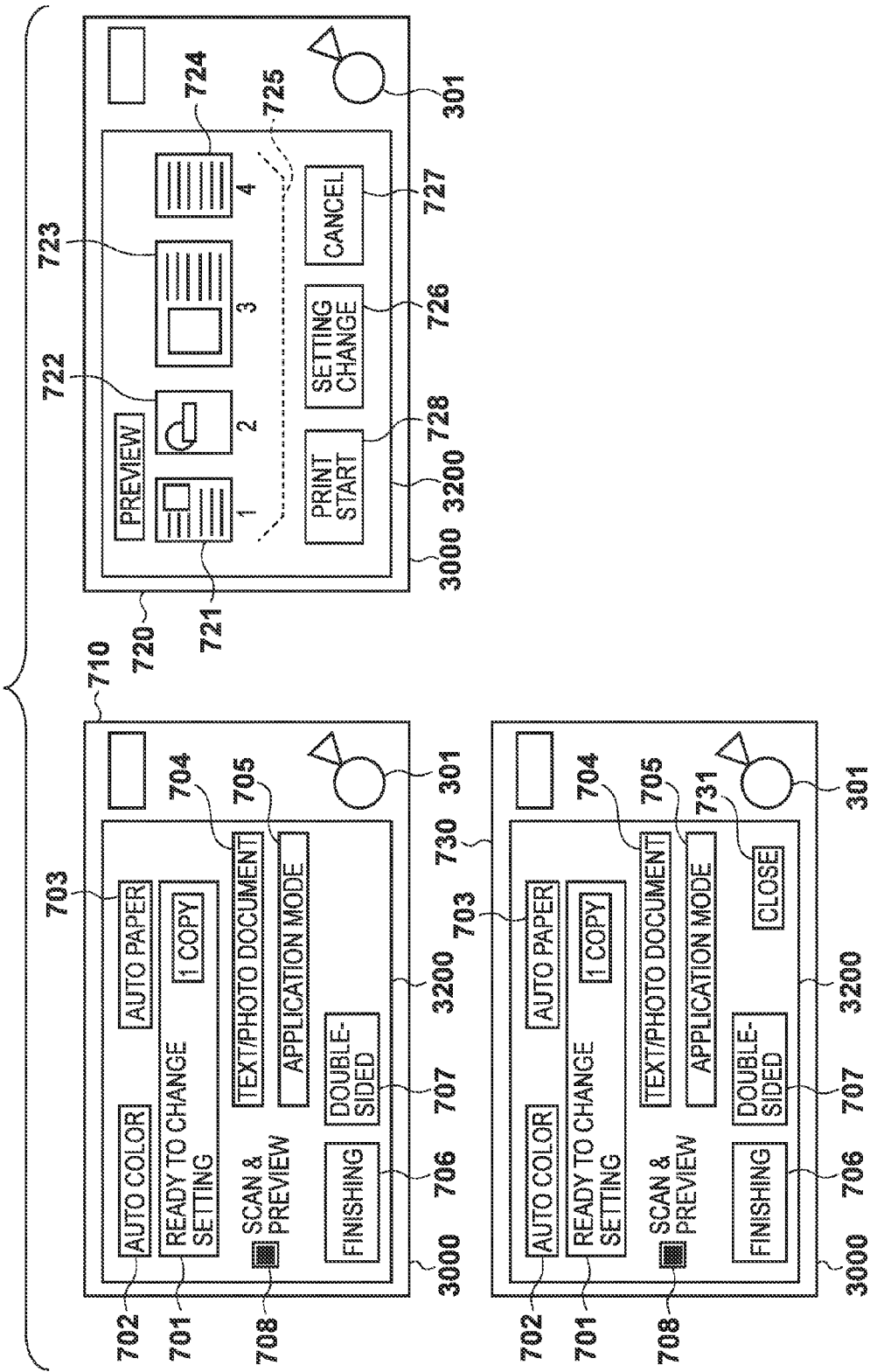

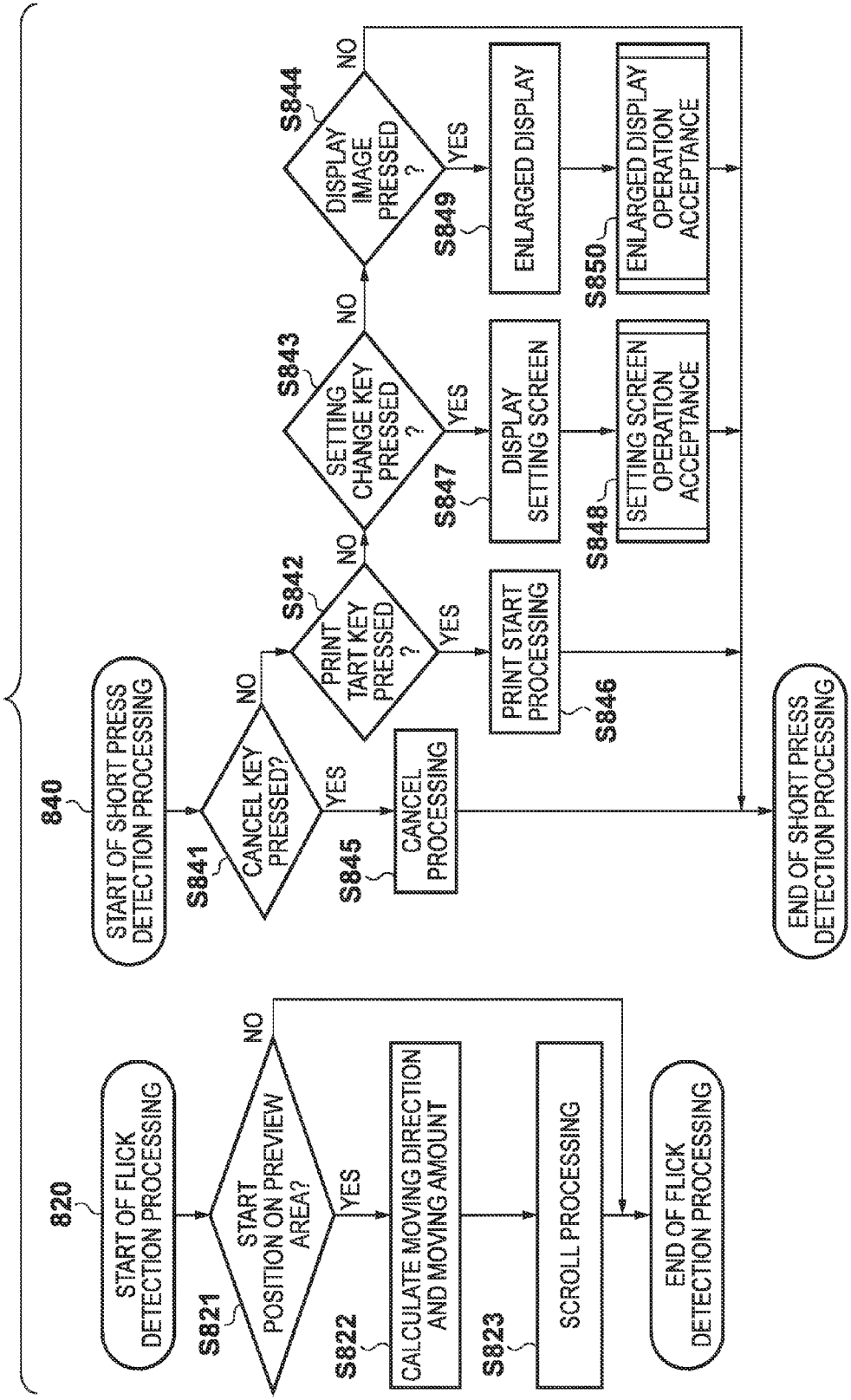

FIG. 9
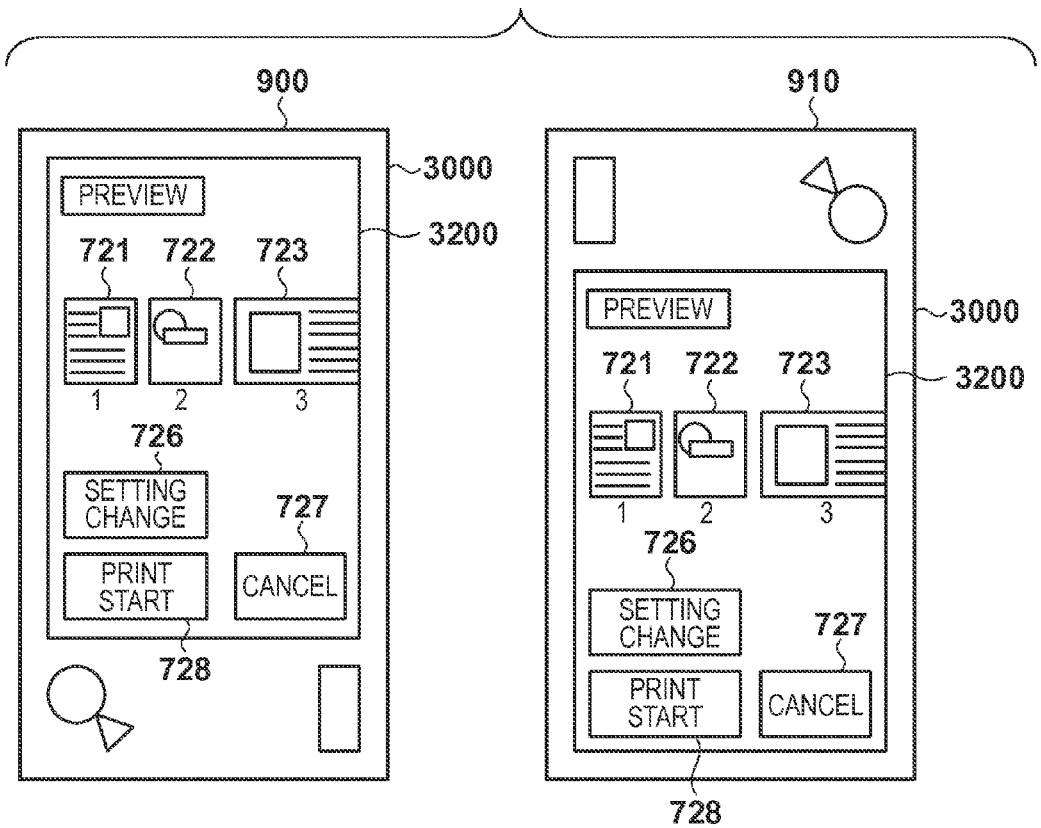
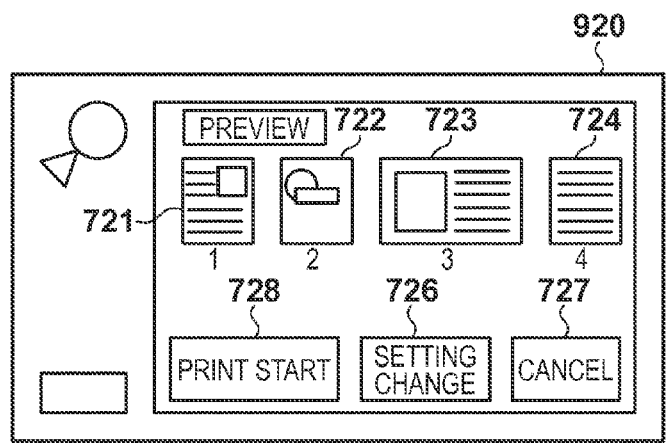

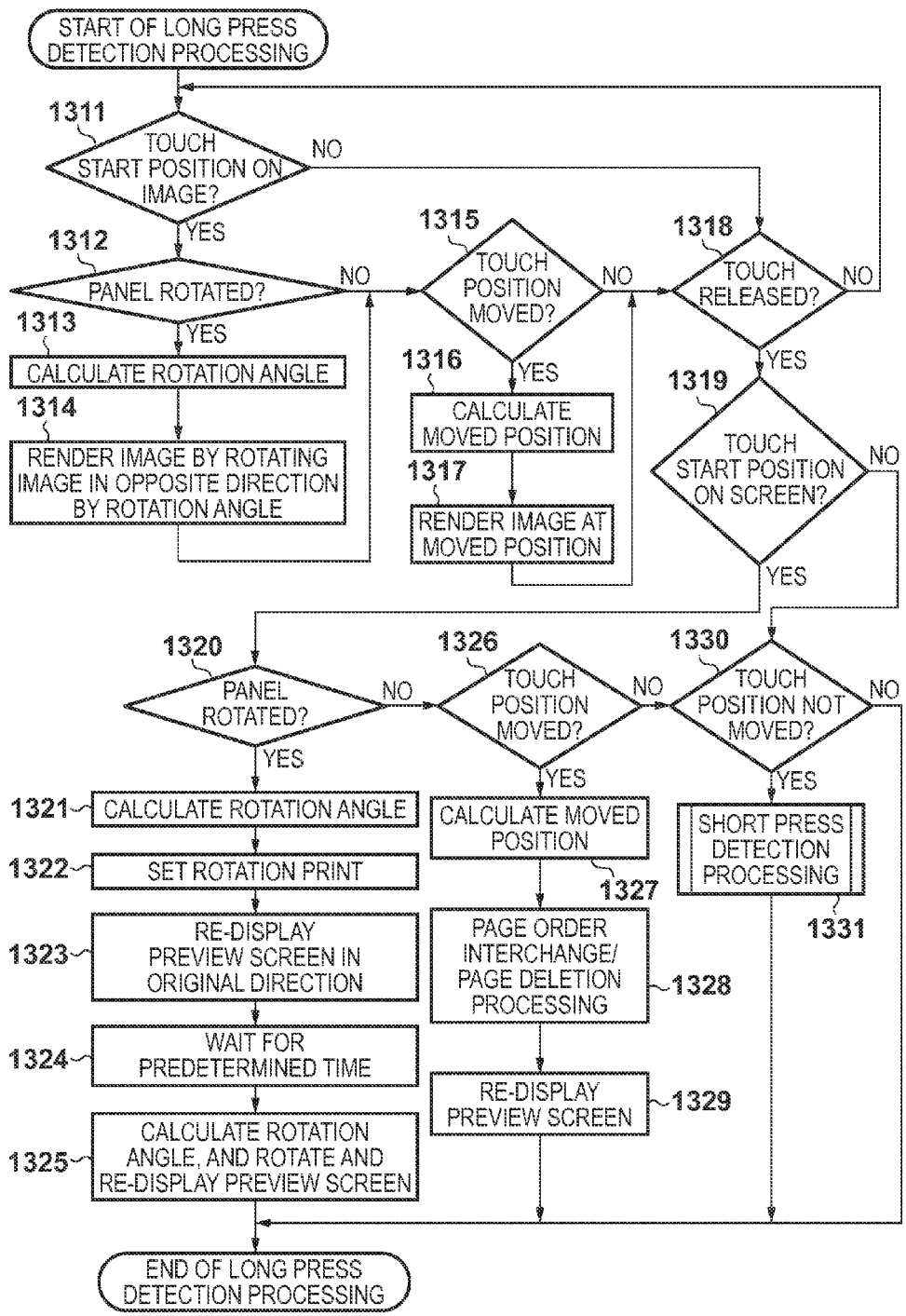

US 8,941,879 B2

INPUT DISPLAY APPARATUS, CONTROL METHOD THEREOF AND STORAGE MEDIUM

BACKGROUND OF THE INVENTION

1. Field of the Invention

The present invention relates to an input display apparatus connected to a printing apparatus to be able to communicate with each other, a control method thereof, and a storage medium and, more particularly, to an operation of an image using a preview display in print settings on an input display panel including an acceleration meter.

2. Description of the Related Art

Conventionally, to a printing apparatus, an input display panel integrated with the printing apparatus (to be referred to as a body hereinafter) is generally connected. Also, a thumbnail or preview of an image to be printed is generally displayed on the input display panel in print settings. On the other hand, in recent years, portable compact computers are popular. Such compact computer is handheld, and includes a large-size liquid crystal touch panel as large as 10". For this reason, it is convenient to display a preview of a print image and, especially, thumbnails of a plurality of pages, and to operate images using displayed thumbnails. Hence, such compact computer is prevalently adopted as an input display panel of a printing apparatus (Japanese Patent Laid-Open No. 2011-54177). Furthermore, a compact computer including a three-dimensional acceleration sensor has a function of recognizing an orientation of the apparatus, and switching a screen to be displayed to a portrait or landscape direction.

However, the aforementioned related art suffers the following problems. In print settings of a printing apparatus, it is demanded to make an operation for changing print directions for respective pages while displaying previews of images. With this operation, the print directions are standardized between a plurality of pages, and print results which are easy to see can be obtained. Upon making such operation, an operation for making a rotation setting of an image while displaying a preview of an image using a touch panel mainly includes the following two operations. (1) After the user selects an image, he or she selects and designates "rotation" from a setting menu. (2) The user touches two points on the image at the same time, and makes a "twist" operation of the touched image, thus designating rotation. In the designation method (1), the user has to search for and select "rotation" from the menu, and this operation is not intuitive. Hence, it is not easy to understand and make such operation for a novice user. On the other hand, the method (2) allows the user to issue a rotation instruction by the intuitive operation. However, a touch panel which detects touches at two or more points at the same time is more expensive than that which detects a touch at only one point, resulting in an increase in product cost.

SUMMARY OF THE INVENTION

The present invention enables realization of an input display apparatus which implements, at a low cost, a print setting method that allows the user to make an intuitive rotation print setting operation in a preview display mode of an image to be printed, a control method thereof, and a storage medium.

One aspect of the present invention provides an input display apparatus configured to communicate with a printing apparatus, the apparatus further comprising: a display unit configured to display a print setting screen; a touch detection unit configured to detect a touch by an operator on the print setting screen displayed on the display unit; an orientation detection unit configured to detect an orientation of an apparatus body, a position determination unit configured to determine which screen components displayed on the print setting screen is touched by the operator based on a detected result by the touch detection unit; an operation determination unit configured to determine a type of an operation from the touch by the operator detected by the touch detection unit; a rotation determination unit configured to determine, based on the orientation of the input display apparatus detected by the orientation detection unit, whether or not the input display apparatus has been rotated on a plane including a display screen of the display unit; and a display control unit configured to rotate and display, in a case that the operation determination unit determines that the operation is a long press operation, and the rotation determination unit determines that the input display apparatus has been rotated, the touched screen component determined by the position determination unit in a direction opposite to a rotation direction of the input display apparatus.

Another aspect of the present invention provides a printing apparatus comprising: a connector configured to connect an input display apparatus; and a power supply controller configured to supply a power to the input display apparatus connected via the connector.

Still another aspect of the present invention provides a control method of an input display apparatus, which comprises a display unit configured to display a print setting screen, a touch detection unit configured to detect a touch by an operator on the print setting screen displayed on the display unit, and an orientation detection unit configured to detect an orientation of an apparatus body, and is configured to communicate with a printing apparatus, the method comprising: determining which screen components displayed on the print setting screen is touched by the operator based on a detected result in the touch detection step; determining a type of an operation from the touch by the operator detected by the touch detection unit; determining based on the orientation of the input display apparatus detected by the orientation detection unit, whether or not the input display apparatus has been rotated on a plane including a display screen of the display unit; and rotating and displaying in a case that it is determined in the determining by the operation determination unit that the operation is a long press operation, and it is determined in the determining by rotation determination unit that the input display apparatus has been rotated, the touched screen component determined in the determining by the position determination unit in a direction opposite to a rotation direction of the input display apparatus.

Yet still another aspect of the present invention provides a computer-readable storage medium storing a computer program for causing a computer to execute respective steps in a control method of the input display apparatus.

Further features of the present invention will be apparent from the following description of exemplary embodiments with reference to the attached drawings.

BRIEF DESCRIPTION OF THE DRAWINGS

FIG. 6 is a flowchart of the operations of the input display panel and printing apparatus body of the copy job according to the embodiment;

FIG. 7 is a view showing a display example of an operation display screen of the copy job according to the embodiment;

FIGS. 8A and 8B are flowcharts of the preview screen operation control of the copy job according to the embodiment;

FIG. 9 is a view showing a display example when the input display panel is rotated on a preview screen according to the embodiment;

FIG. 13 is a flowchart of the control of the long press operation on the preview screen of the copy job according to the embodiment.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

<Arrangement of Print System>

An arrangement example of a print system according to one embodiment of the present invention will be described below with reference to FIG. 1. A printing apparatus of this embodiment is a so-called POD (Print-On-Demand) machine, and meets different kinds of print/bookbinding requests by combining various options which can attain saddle stitching, cutting, folding, and the like.

Figure 1:
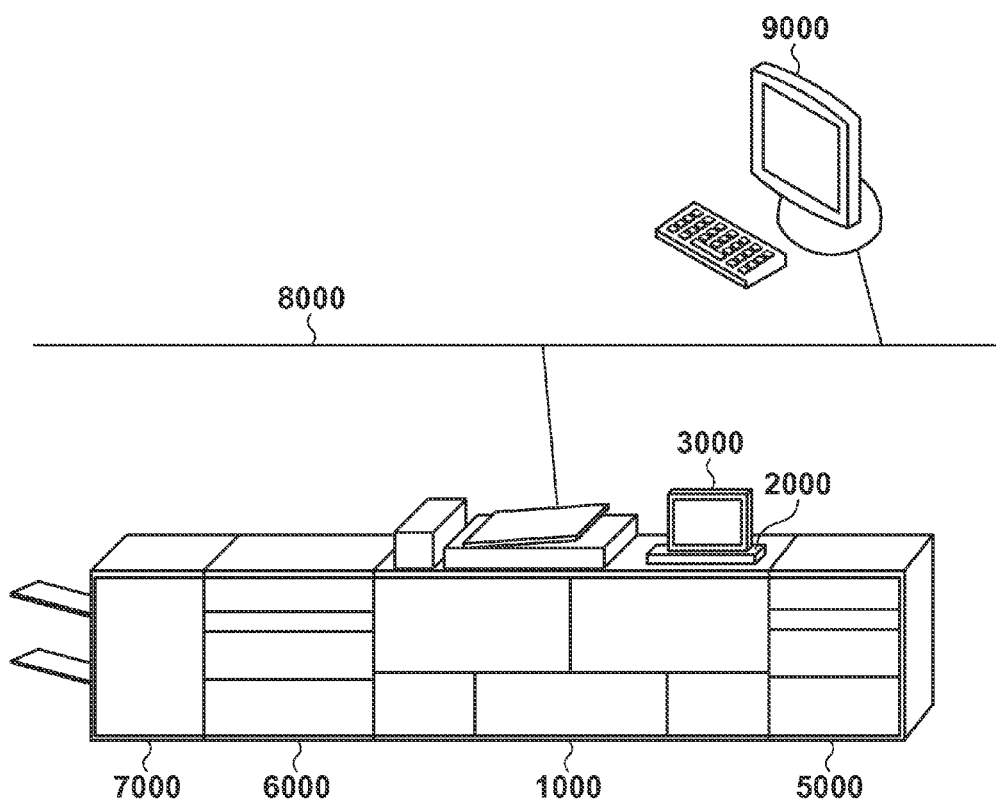
FIG. 1 is a view showing a print system according to an embodiment.

The print system shown in FIG. 1 is an example of a combination of a printing apparatus 1000 with an input display panel (input display apparatus) 3000, paper deck 5000, binder 6000, and finisher 7000. The printing apparatus 1000 can establish connection to a personal computer 9000 via a LAN 8000, and can mutually communicate with the personal computer 9000. On the personal computer 9000, the user generates a print job including creation/editing of each individual page, and settings of bookbinding, cutting, folding, and the like. A generated print job is sent to the printing apparatus 1000 via the LAN 8000 together with print data, thus allowing a printout operation. A scan image file transmission operation which transmits a scan image of a paper document scanned by the printing apparatus 1000 to the personal computer 9000 can also be executed.

The input display panel 3000 is an input display user interface which includes an acceleration sensor and is detachable from the printing apparatus 1000, and is attached to a dock 2000 mounted on the printing apparatus 1000. The detachable input display panel 3000 can detect a tilt since it includes the acceleration sensor. Also, when the input display panel 3000 is attached to the dock 2000, it can be charged by a power supplied from the dock 2000. Furthermore, the input display panel 3000 is a user interface which allows the user to make settings and the like of the printing apparatus 1000, and can be used while being detached from the dock 2000. For this reason, the input display panel 3000 and printing apparatus 1000 desirably exchange information via wireless communications. Note that options such as the paper deck 5000, binder 6000, and finisher 7000 are not directly related to the present invention, and a detailed description thereof will not be given.

<Control Arrangement>

Figure 2:
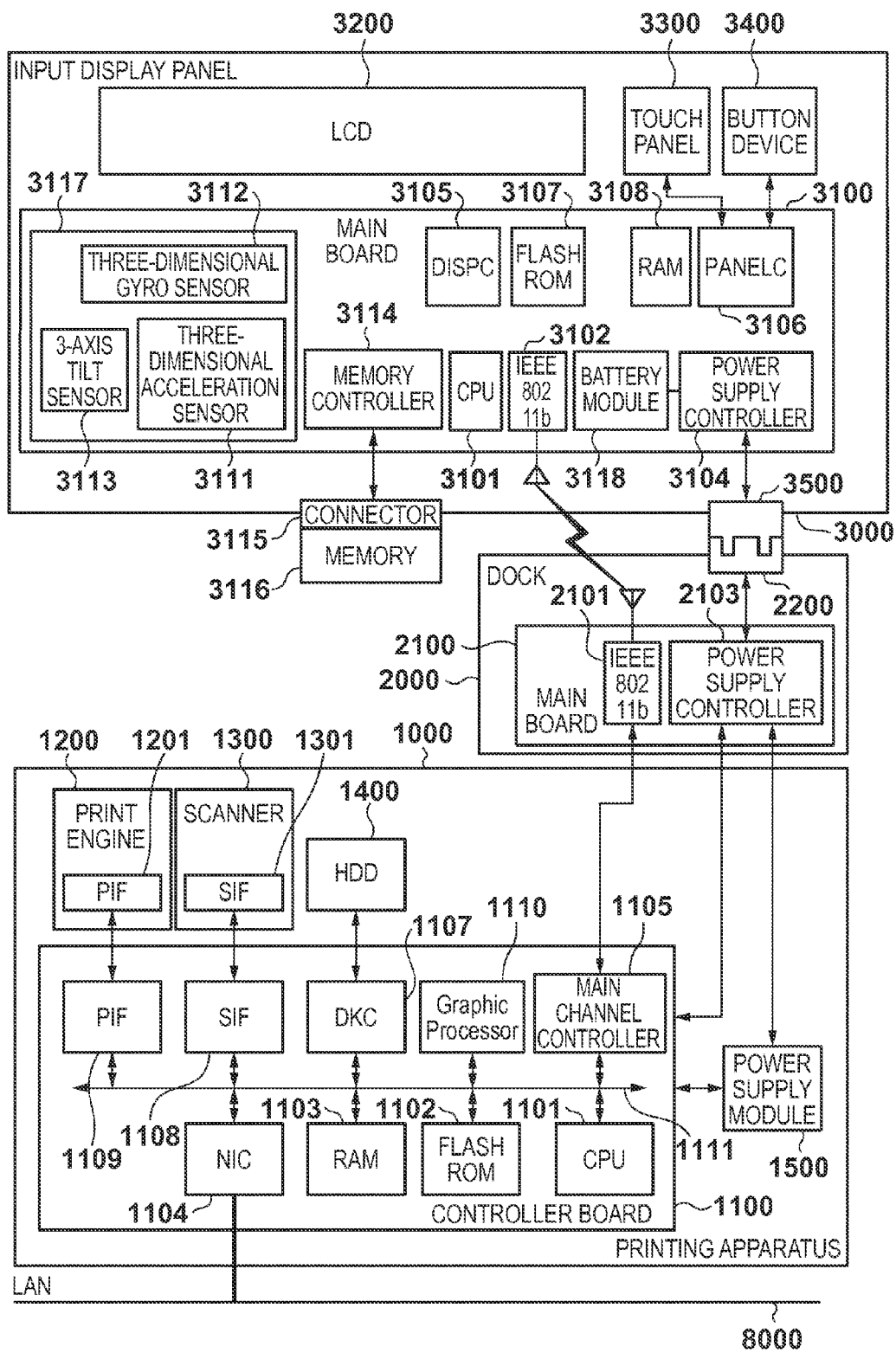
FIG. 2 is a block diagram showing the control arrangement of a printing apparatus and input display panel according to the embodiment.

FIG. 2 is a block diagram showing the control arrangement of the printing apparatus 1000, dock 2000, and input display panel 3000. Modules which respectively configure the printing apparatus 1000, dock 2000, and input display panel 3000 will be described below. As shown in FIG. 2, the printing apparatus 1000 mainly includes a controller board 1100, print engine 1200, scanner 1300, hard disk drive (HDD) 1400, and power supply module 1500. The respective devices operate based on a power supplied from the power supply module 1500.

The controller board 1100 includes a CPU 1101, FLASH ROM 1102, RAM 1103, network interface card (NIC) 1104, main channel controller 1105, disk controller (DKC) 1107, scanner interface (SIF) 1108, printer interface (PIF) 1109, and graphic processor 1110. The devices 1101 to 1110 are respectively connected via a bus 1111.

The CPU 1101 is a processor which systematically controls the respective devices connected to the bus 1111, reads out firmware modules as control programs, which are stored in the FLASH ROM 1102 and HDD 1400 onto the RAM 1103, and executes the readout modules. The RAM 1103 functions as a main memory and work area of the CPU 1101. Also, the RAM 1103 is also used as an image memory, and temporarily stores image data which are input/output by the respective modules on the controller board 1100. The image input/output processing between the RAM 1103 and respective modules is executed via DMA transfer controlled by a bus controller on the bus 1111. The NIC 1104 bi-directionally exchanges data with the personal computer 9000 and another printing apparatus via the LAN 8000.

The HDD 1400 is accessed via the DKC 1107, and not only stores the firmware modules but also is used as a temporary storage location of an image. When image data is stored in the HDD 1400, image data temporarily stored on the RAM 1103 is transferred to the HDD 1400 via the DKC 1107. When image data stored on the HDD 1400 is to be read out, it is transferred to the RAM 1103 via the DKC 1107. The graphic processor 1110 applies processes such as an image rotation process, image variable-magnification process, color space conversion process, binarization process, scanner image input process, and printer image output process to image data stored on the RAM 1103. The RAM 1103 is used as a temporary work area of the graphic processor 1110.

The scanner 1300 includes a scanning sensor, document convey mechanism, and the like (not shown). The scanning sensor, document convey mechanism, and the like are controlled based on the firmware modules executed by the CPU 1101 via the SIF 1108 mounted on the controller board 1100 and an SIF 1301 mounted on the scanner 1300. As a result, a document is scanned by the scanning sensor, and obtained data is transferred to the RAM 1103 via the SIFs 1301 and 1108.

The print engine 1200 includes an electrophotography printing unit, print paper cassette, paper convey unit, and the like. From the controller board 1100, a print request based on a print job is sent via the PIF 1109 and a PIF 1201 mounted on the print engine 1200. The printing unit, paper convey unit, and the like are similarly controlled based on the firmware modules executed by the CPU 1101 via the PIFs 1109 and 1201. Furthermore, image data to be printed is transferred from the RAM 1103 to the PIFs 1109 and 1201 under the control of the CPU 1101. As a result, an image is formed on a paper sheet in accordance with the print request. The main channel controller 1105 is used when the printing apparatus 1000 and the detachable input display panel 3000 as a characteristic feature of the present invention exchange data.

<Dock>

The dock 2000 mainly includes a main board 2100 and connector 2200. The main board 2100 included in the dock 2000 mainly includes an IEEE802.11b module 2101 and power supply controller 2103. The IEEE802.11b module 2101 is connected to the main channel controller 1105 of the controller board 1100, and intermediates wireless communications between the printing apparatus 1000 and input display panel 3000 based on a request from the controller board 1100.

The power supply controller 2103 is connected to the power supply module 1500, which supplies a power to the IEEE802.11b module 2101 via the power supply controller 2103. The power supply controller 2103 is also connected to the connector 2200. When a connector 3500 of the input display panel 3000 is connected to the connector 2200 of the dock 2000, the power supply controller 2103 supplies a power to the input display panel 3000. In addition, the power supply controller 2103 monitors a power supply state to detect whether or not the dock 2000 and input display panel 3000 are connected, and transfers a detection result to the controller board 1100.

<Input Display Panel>

As shown in FIG. 2, the detachable input display panel 3000 including an acceleration sensor mainly includes a main board 3100, LCD 3200, touch panel 3300, button device 3400, and connector 3500. The main board 3100 mainly includes a CPU 3101, IEEE802.11b module 3102, power supply controller 3104, display controller (DISPC) 3105, panel controller (PANELC) 3106, FLASH ROM 3107, and RAM 3108. The respective modules 3101 to 3108 are connected via a bus (not shown) as in the controller board 1100.

The CPU 3101 is a processor which systematically controls the respective devices connected to the bus, and executes firmware modules as control programs stored in the FLASH ROM 3107. The RAM 3108 functions as a main memory and work area of the CPU 3101, and a video image area to be displayed on the LCD 3200.

The CPU 3101 can detect an orientation and motion of the input display panel 3000 using a three-dimensional acceleration sensor 3111 and three-dimensional gyro sensor 3112. Furthermore, the CPU 3101 controls the DISPC 3105 according to the orientation detection result to control data to be displayed on the LCD 3200. The three-dimensional acceleration sensor 3111 has a movable part in a semiconductor chip. A fin of the movable part moves by an externally applied acceleration, and an interval with that of an immovable part changes, thus changing a capacitance. The three-dimensional gyro sensor 3112 is a semiconductor element of a method using the Coriolis force. When the outputs from the two sensors undergo signal processing in consideration of the influence of a gravity, for example, whether the input display panel 3000 is set in an upright state or flat state or at a portrait position or landscape position, and three-dimensional motions and positions such as back and forth motions, right and left motions, and up and down motions can be precisely detected. Note that as the three-dimensional acceleration sensor 3111, a piezoresistance type, heat detection type, and the like are known, and the present invention can adopt all of these known methods. When the input display panel 3000 upon power supply is set at an upright position using the dock 2000 or the like, a portrait or landscape position can be recognized using a three-axis tilt sensor 3113 independently of the three-dimensional acceleration sensor 3111 and three-dimensional gyro sensor 3112. The input display panel 3000 can detect the direction and orientation of the apparatus using these various kinds of sensors. Note that the three-dimensional acceleration sensor 3111, three-dimensional gyro sensor 3112, and three-axis tilt sensor 3113 will be collectively referred to as an orientation detection sensor 3117 for the sake of simplicity. The orientation detection sensor 3117 detects the orientation of the apparatus body of the input display panel 3000.

The display controller (DISPC) 3105 transfers a video image rendered on the RAM 3108 to the LCD 3200, and controls the LCD 3200 according to a request of the CPU 3101. As a result, the image is displayed on the LCD 3200. The panel controller (PANELC) 3106 controls the touch panel 3300 and button device 3400 according to a request of the CPU 3101. With this control, the pressed position on the touch panel 3300, a pressed key code on the button device 3400, and the like are returned to the CPU 3101.

The memory controller 3114 accesses an external memory 3116 such as an SD memory via an external memory controller 3115 under the control of the CPU 3101. The memory controller 3114 can read out data from the external memory 3116, and can display the readout data on the LCD 3200 via the DISPC 3105. Also, the memory controller 3114 can exchange data with the printing apparatus 1000 via the CPU 3101 and IEEE802.11b module 3102.

The power supply controller 3104 is connected to the connector 3500, and receives a power supplied from the power supply module 1500 of the printing apparatus 1000 when the connector 2200 of the dock 2000 is in a contact state. To the power supply controller 3104, a battery module 3118 is connected. The battery module 3118 has a chargeable battery, can accumulate a power by charging, and can externally supply the accumulated power. When the input display panel 3000 is connected to the dock 2000, and a power supply from the power supply module 1500 is received, the power supply controller 3104 supplies a power to the overall input display panel 3000 while charging the connected battery module 3118. On the other hand, when the input display panel 3000 is detached from the dock 2000, and no power is supplied from the power supply module 1500, the power supply controller 3104 supplies a power from the battery module 3118 to the overall input display panel 3000. The IEEE802.11b module 3102 establishes a wireless communication with the IEEE802.11b module 2101 of the dock 2000 to intermediate a communication with the printing apparatus 1000 under the control of the CPU 3101.

<Wireless Communication>

A wireless communication in this embodiment will be described below. As has been slightly described in FIG. 2, in this embodiment, a wireless communication is made according to the IEEE802.11b specification as a known technique. In the print system of this embodiment, a wireless communication is made in the infrastructure mode in which the printing apparatus 1000 serves as an access point (AP), and the input display panel 3000 serves as a terminal. When a plurality of bodies exist within a range in which radio waves can reach, ESSIDs of the plurality of bodies which can communicate with are displayed on the input display panel 3000 side like an existing personal computer, and the user can select one of them. After a communication partner is established by association, the input display panel 3000 of this embodiment can receive scan data, job history data, and the like from the printing apparatus 1000, and can display them on itself.

Information of user operations for the touch panel 3300, button device 3400, and orientation detection sensor 3117, information associated with print settings of output materials, and data stored in the external memory 3116 are wirelessly sent from the input display panel 3000 to the printing apparatus 1000. These wireless communications are made using predetermined protocols. For example, a pressed position on the touch panel 3300, a pressed key code on the button device 3400, the direction of the input display panel detected by the orientation detection sensor 3117, setting information of the number of copies to be printed, video data stored in the external memory 3116, and the like are transmitted.

Upon reception of information associated with operations, the CPU 1101 of the printing apparatus 1000 controls individual operations based on the received information. For example, video data sent from the input display panel 3000 to the printing apparatus 1000 is rendered on the RAM 1103, and then undergoes image processing by the CPU 1101 based on the received information. Then, an image is formed by the print engine 1200 via the PIF 1201. In this manner, the print system of this embodiment is a system in which the printing apparatus 1000 and input display panel 3000 can make wireless communications with each other.

<Input Display Panel and Basic Screen>

Figure 3:
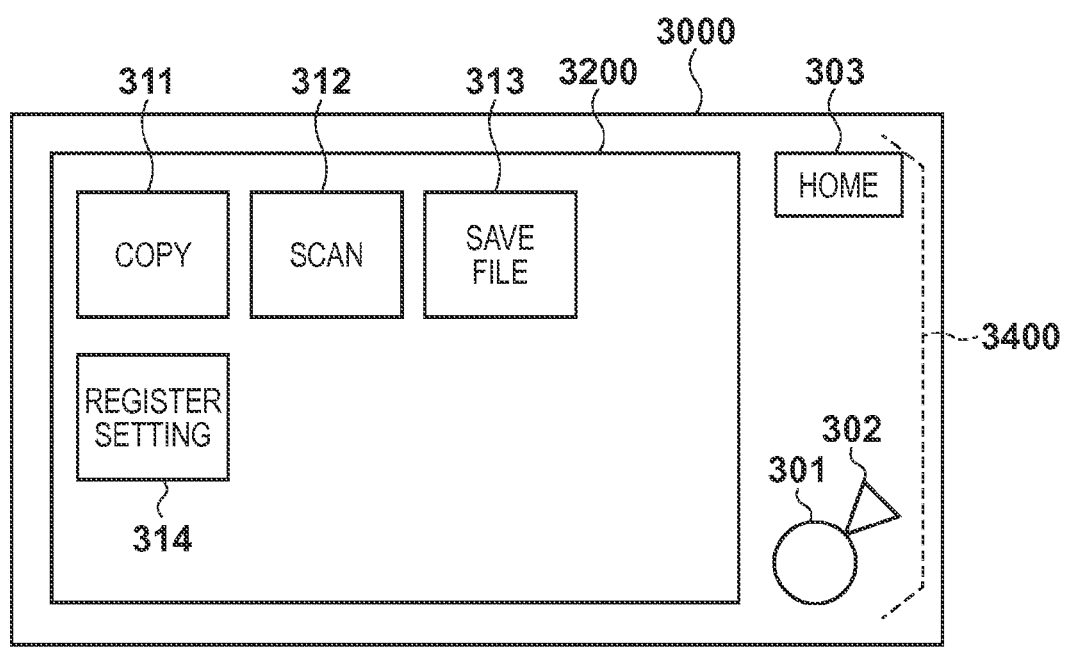
FIG. 3 is a view showing the outer appearance of the input display panel and a display example of a basic screen according to the embodiment.

The arrangement of the input display panel 3000 in this embodiment will be described below with reference to FIG. 3. On the front surface of the input display panel 3000, the button device 3400 and LCD 3200 are mainly mounted. In FIG. 3, the button device 3400 includes three hardware keys. Reference numeral 301 denotes a start key which is mainly used to start a job in the printing apparatus 1000. Reference numeral 302 denotes a stop key which is mainly used to stop a job in the printing apparatus 1000. Reference numeral 303 denotes a home key which is used to display a basic screen (to be described below) on the LCD 3200.

The basic screen is displayed on the LCD 3200 in FIG. 3. Reference numeral 311 denotes a copy key used to shift to a mode for making an operation of a copy job. Reference numeral 312 denotes a scan key used to shift to a mode for making a scan function operation. Reference numeral 313 denotes a file operation key used to shift to a mode for making an operation of image files saved in the input display panel 3000 and controller board 1100. The CPU 3101 displays this basic screen upon power ON of the input display panel 3000 or upon detection of pressing of the home key 303.

The touch panel 3300 is disposed to be overlaid on the LCD 3200. When the user touches the LCD 3200, the touch panel 3300 detects the touch position. The CPU 3101 reads out position information detected by the touch panel 3300 via the PANELC 3106. Thus, the CPU 3101 can acquire the position touched by the user.

Screen components such as the aforementioned keys 311 to 313 on the LCD 3200 are managed by the CPU 3101. The CPU 3101 manages information of display coordinates on the panel and sizes on the panel of respective screen components while storing them in the RAM 3108. The CPU 3101 acquires the position touched by the user from the touch panel 3300, and searches for information of a position and size of the managed screen component based on the touch position information, thereby detecting the screen component touched by the user. Then, the CPU 3101 executes processing corresponding to the detected screen component, thus realizing a touch operation of the LCD 3200.

<Scan Processing in Copy Job>

The processing sequence of scan processing in a copy job in this embodiment will be described below with reference to FIG. 4. The processing to be described below is implemented when the CPU 1101 reads out a control program stored in the FLASH ROM 1102 and HDD 1400 onto the RAM 1103, and executes the readout program.

In step S401, the CPU 1101 acquires, from the input display panel 3000, the setting contents when the user has made copy settings of this copy image output job on the input display panel 3000. The copy setting contents include a color mode, the number of copies, paper size, single-/double-sided, enlargement/reduction factor, sorting output, and ON/OFF of stapling. Of these settings, the color mode, single-/double-sided of a document, enlargement/reduction factor, and the like are especially related to the scan processing.

In step S402, upon reception of a copy start instruction on the input display panel 3000, the CPU 1101 controls the scanner 1300 via the connector to perform scanning operations of image data of documents. Documents stacked on a document feeder unit on the scanner 1300 are fed onto a platen glass on the scanner 1300 one by one, and a document size is simultaneously detected at that time. The scanner 1300 exposes and scans the document based on the detected document size, thereby reading image data. Image data read in step S402 is transferred to the RAM 1103 via the SIFs 1301 and 1108, and is temporarily stored in the RAM 1103. Assume that in this embodiment, image data is always read at an equal magnification (100%) irrespective of the enlargement/reduction factor setting in the copy settings, and the graphic processor 1110 (to be described below) executes variable-magnification processing in both the main scan direction and sub-scan direction.

In step S403, the CPU 1101 transfers the image data temporarily stored in the RAM 1103 to the graphic processor 1110. Subsequently, in step S404, the graphic processor 1110 executes image processing based on copy setting parameters. For example, when an enlargement factor=400% is set, the graphic processor 1110 executes variable-magnification processing in both the main scan direction and sub-scan direction using an image variable-magnification unit as a module in the graphic processor 1110. Upon completion of the image processing of the image data, the process advances to step S405.

In step S405, the graphic processor 1110 compresses, in a designated image format, the image data which has undergone the image processing, and transfers the compressed image data to the RAM 1103. In this embodiment, a popular JPEG format is used as the compression format. The CPU 1101 stores the transferred image data on the RAM 1103. Subsequently, in step S406, the CPU 1101 converts the image data stored on the RAM 1103 into a file in a designated file format, and transfers the filed image data to the HDD 1400. In this embodiment, since the compression format of image data is JPEG, file conversion is attained by appending a general JPEG header. In this way, the read image data is stored in the HDD 1400.

Furthermore, in step S407, the CPU 1101 converts an attribute of the scanned image and setting data upon printing that image into a file, and transfers and stores the file to the HDD 1400. In this case, the image attribute to be saved is that required to decode and process image data in a print mode, and includes the numbers of pixels in the vertical and horizontal directions, a color space, the number of bits per plane and the number of planes, JPEG compression coefficients, a color or monochrome image, and the like. Also, the print settings to be saved include a print paper size, double-sided setting, ON/OFF of finishing, color/monochrome print mode, and the like. Upon saving a file in steps S406 and S407, naming rules of a file name are defined so as to identify a page number of the file, and to associate an image data file with an attribute/setting file. For example, an image data file name of the 1st page is set as [copy0001_data.dat], and an attribute/setting file name is set as [copy0001_attr.dat]. For the 2nd and subsequent pages, a numeral part is set as a page number. For example, for the 5th page, [copy0005_data.dat] and [copy0005_attr.dat] are set. In this manner, when image data is printed or previewed after the scan processing, files from which image data and image attribute/print settings are read out can be identified.

The CPU 1101 determines in step S408 whether or not documents to be scanned still remain on the document feeder unit on the scanner 1300. If documents to be scanned remain on the document feeder unit, the process advances to step S409 to convey the next document, and to exchange documents. The process then returns to step S402 to scan the next document. If no next document remains on the document feeder unit in step S407, the CPU 1101 ends the scan operation of the copy processing.

<Print Processing in Copy Job>

A print operation for printing image data stored in the HDD 1400 as a result of the scan operation in FIG. 4 will be described below with reference to FIG. 5. The processing to be described below is implemented when the CPU 1101 reads out a control program stored in the FLASH ROM 1102 and HDD 1400 onto the RAM 1103, and executes the readout program.

In step S501, the CPU 1101 sets "1" as a page number to be printed, that is, it sets to start print processing from the first page. The following processing is executed for the page number set in this step. In step S502, the CPU 1101 reads out data from the image attribute/print setting file saved in the scan mode (step S407 in FIG. 4). Respective processes are executed based on the image attribute and print settings read out in this step.

In step S503, if an image data file to be printed is not stored on the RAM 1103, the CPU 1101 loads the image file from the HDD 1400, and stores it on the RAM 1103. Subsequently, in step S504, the CPU 1101 transfers the image data stored on the RAM 1103 to the graphic processor 1110. In step S505, the graphic processor 1110 applies printer image processing to the transferred image data using a printer image processor in itself. After that, in step S506, the graphic processor 1110 stores the processed image data on the RAM 1103.

In step S507, the CPU 1101 transfers the image data on the RAM 1103 to the print engine 1200 at an appropriate timing while controlling the print engine 1200 via the PIFs 1109 and 1201. In step S508, the print engine 1200 feeds an output sheet according to the print settings from the paper deck 5000. In this case, if a double-sided print setting is ON, and an image is to be printed on the reverse face, a sheet is fed from a double-sided buffer (not shown) in the print engine 1200. In case of the obverse face of the double-sided print mode or a single-sided print mode, a paper cassette which stores sheets having a size saved in the print settings is selected from normal paper cassettes in the paper deck 5000, and a sheet is fed from that cassette. Subsequently, in step S509, the print engine 1200 develops/transfers/fixes the image data transferred in step S507 on the sheet, thus recording (printing) an image.

In step S510, the print engine 1200 executes, for the printed output sheet, post-processing to be executed for each page using the binder 6000 and finisher 7000. The post-processing which can be executed in this step mainly includes addition of punch holes, folding of the output sheet (for example, Z- or C-folding), and the like, although it changes depending on the functions of the binder 6000 and finisher 7000. Furthermore, upon completion of the post-processing, the sheet is discharged to a discharge port (not shown) on the finisher 7000. Note that at this time, if the double-sided print setting is included, and the obverse face is to be printed, the output sheet is conveyed to the double-sided buffer in the print engine 1200 to successively execute the print operation on the reverse face, while skipping the post-processing and discharge operation. In step S508 above, the sheet in this double-sided buffer is fed to implement the double-sided print operation.

The print engine 1200 determines in step S511 whether or not next image data to be printed is stored in the HDD 1400. If the next image to be printed is stored, the process advances to step S512, and the print engine 1200 increments the page number by +1, that is, it sets print processing of the next page. Then, the process returns to step S502 to execute the print processing of the next image data. On the other hand, if no next image data to be printed is stored in step S511, the process advances to step S513, and the print engine 1200 determines whether or not image input processing, that is, the scan processing in this case, is complete for all documents.

If NO in both steps S511 and S513, since the number of pages of a copy to be printed is not settled, steps S511 and S513 are repeated to wait until the number of pages is settled. If YES in step S513, the process advances to step S514, and the print engine 1200 executes post-processing for each copy of the output sheets using the finisher 7000. The post-processing for each copy to be executed in this step includes stapling and the like. Next, the CPU 1101 determines in step S515 whether or not the output operations as many as the number of copies set in the copy settings are complete. If the output operations are not complete yet, the process returns to step S501 to execute the print processing from the first image data, thus printing the next copy. On the other hand, if the output operations as many as the number of copies in the settings are complete in step S515, the print operation of the copy job ends, thus also ending the copy job.

<Display Screen Related to Copy Job>

A display screen in the copy job will be described below with reference to FIG. 7. Reference numeral 710 denotes a copy setting screen which is displayed on the LCD 3200 under the control of the CPU 3101 of the input display panel 3000. This screen is displayed in response to detection of pressing of the copy icon 311 on the default screen shown in FIG. 3. A field 701 indicates whether or not the printing apparatus 1000 is set in a ready-to-copy state, and also the set number of copies (one copy in FIG. 7).

A document select tab 704 is that used to select a document type. Upon pressing of this tab, the CPU 3101 popup-displays three types of select menus of text, photo, and text/photo modes. A finishing tab 706 is that used to make settings associated with various kinds of finishing. A double-sided setting tab 707 is that used to make settings associated with a double-sided scan mode and double-sided print mode. An auto color tab 702 is that used to select the scan mode of the document. Upon pressing of this tab, the CPU 3101 popup-displays three types of select menus of color/black/auto (ACS) modes. When the color mode is selected, color copy processing is executed; when the black mode is selected, monochrome copy processing is executed. On the other hand, when the ACS mode is selected, a color or monochrome copy mode is decided according to a document to be scanned. Upon reception of a copy job execution notification, the CPU 1101 discriminates using the SIF 1108 whether or not an image data signal received from the scanner 1300 is only a monochrome signal, and decides the copy mode.

A paper select tab 703 is that used to select a paper deck of a sheet to be output. A check box 708 is a toggle button used to set whether or not a preview of a scanned document image is to be displayed after completion of the scan operation of a document. When a copy job is started while unchecking the check box 708, the CPU 1101 executes the copy job without displaying any preview of a scanned image by successively executing the scan processing and print processing described using FIGS. 4 and 5.

Figure 4:
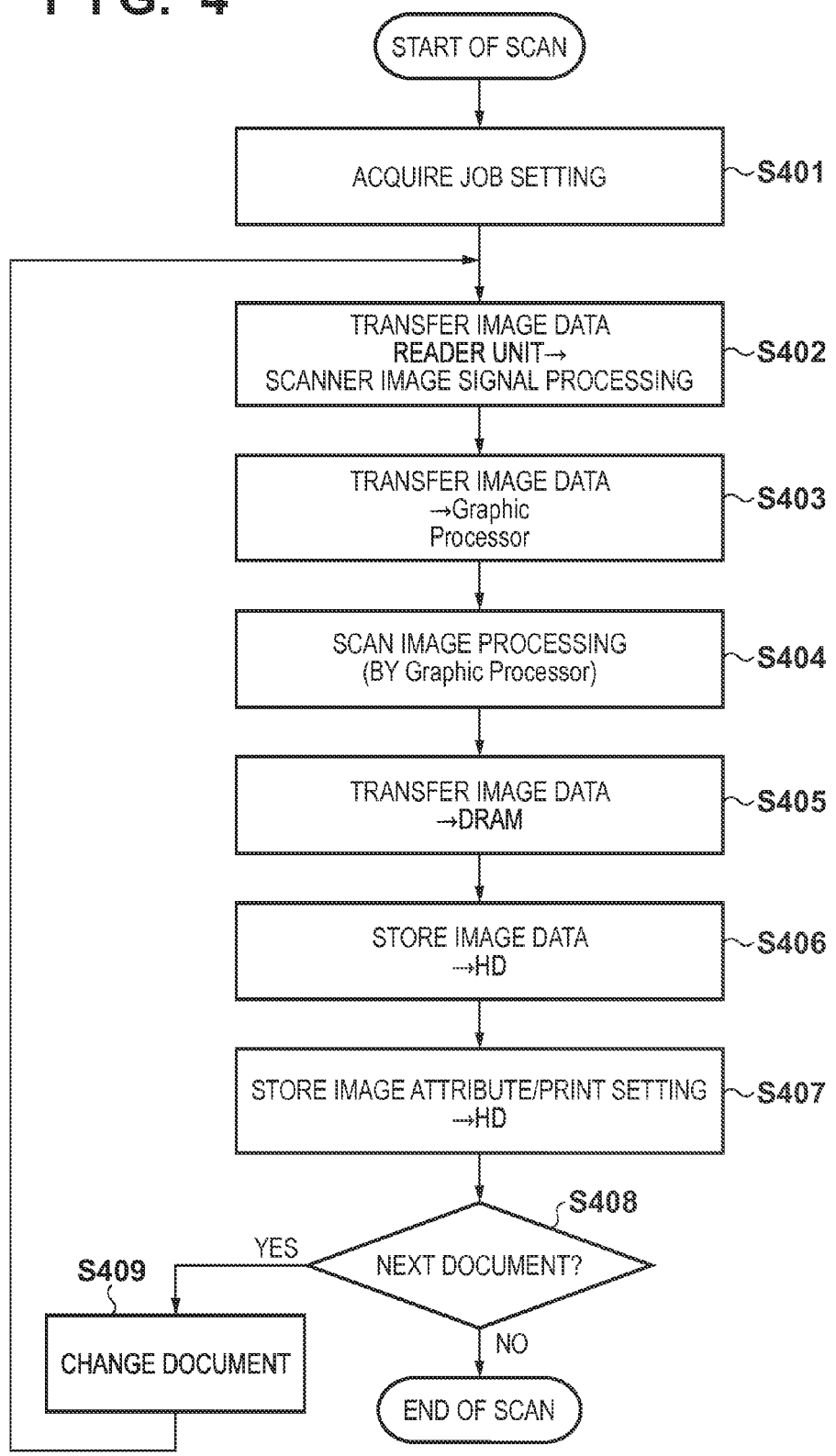
FIG. 4 is a flowchart of scan processing of a copy job according to the embodiment.
Figure 5:
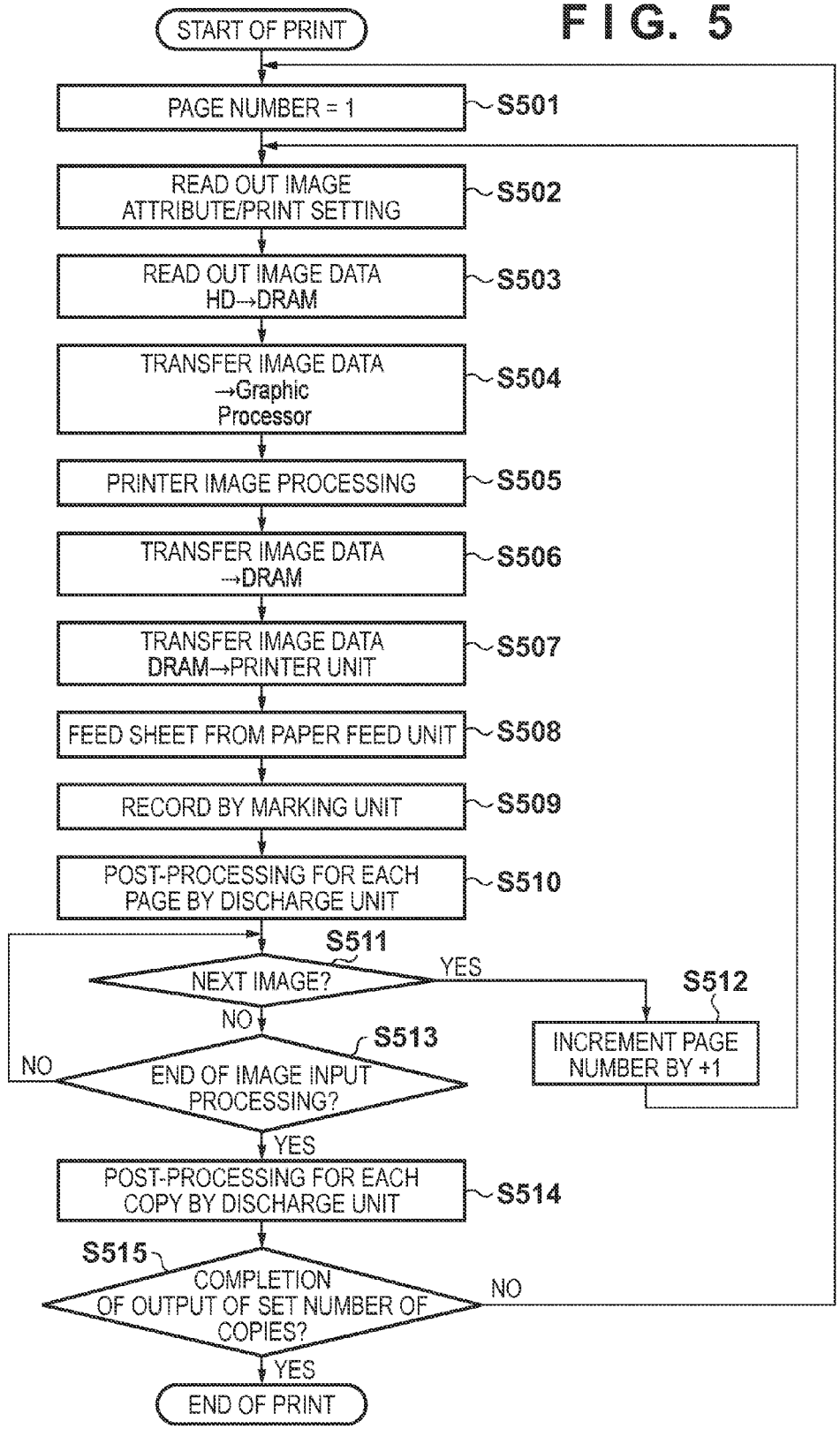
FIG. 5 is a flowchart of print processing of the copy job according to the embodiment.

On the other hand, when a copy job is started while checking the check box 708, a preview screen 720 is displayed after completion of the scan processing shown in FIG. 4, thus displaying a preview of a document image. On the screen 720, an area 725 is a preview display area. Images 721, 722, 723, and 724 are respectively preview examples of scanned images. Page numbers are displayed below the respective images.

Upon pressing of a setting change key 726, the CPU 3101 displays a setting change screen 730. The screen 730 has the same configuration as the screen 710, and allows an operator to change print settings such as paper deck settings and finishing settings. Unlike the screen 710, a "close" key 731 is added to the screen 730. Upon detection of pressing of this close key 731, the CPU 3101 clears the screen 730, and displays the screen 720 again to accept subsequent operations.

When a cancel key 727 is pressed on the screen 720, the CPU 3101 displays the screen 710 again, and cancels a copy job. When a print start key 728 is pressed, the CPU 3101 starts print processing, thus executing a copy job.

<Execution Processing of Copy Job>

Execution processing of a copy job will be described below with reference to the flowchart shown in FIG. 6. In this embodiment, since the operations are made on the input display panel 3000, and the controller board 1100 executes a job, they execute processing in coordination with each other. FIG. 6 describes the processes of the respective CPUs 1101 and 3101 on the right and left sides. Note that communications between the input display panel 3000 and controller board 1100 are made via wireless communications or the dock 2000, as described above.

When the CPU 3101 detects pressing of the start key 301 on the screen 710, it starts a copy job. In step S601, the CPU 3101 acquires copy job settings made on the screen 710 by the user, transmits the setting contents to the CPU 1101, and also transmits a scan start instruction to the CPU 1101.

Upon reception of the copy job settings and scan start instruction, the CPU 1101 executes scan processing in step S621. The scan processing to be executed in this step is that described above using the flowchart shown in FIG. 4. Upon completion of the scan processing, the process advances to step S622, and the CPU 1101 sends a scan end notification to the CPU 3101.

In step S602, the CPU 3101 receives the scan end notification. Subsequently, the CPU 3101 determines in step S603 whether or not preview=ON is designated in the copy job settings acquired in step S601, that is, whether or not the check box 708 on the screen 710 is checked. If preview=ON is not designated, the process jumps to step S612 without executing preview processing, and the CPU 3101 notifies the CPU 1101 of a print start instruction required to start print processing. Processing from the start of print processes will be described later. On the other hand, if preview=ON is designated in step S603, the CPU 3101 executes the preview processing in step S604 and subsequent steps. In step S604, the CPU 3101 sends an acquisition request of image attribute/print setting files to the CPU 1101.

In step S623, the CPU 1101 receives this request. Subsequently, in step S624, the CPU 1101 transmits image attribute/print setting files for respective pages to the CPU 3101 according to the request received in step S623. In step S605, the CPU 3101 receives the image attribute/print setting files. In step S606, the CPU 3101 notifies the CPU 1101 of an acquisition request of display image data.

In step S625, the CPU 1101 receives the image data acquisition request. In step S626, the CPU 1101 reads out an image of each page stored in the HDD 1400 to the RAM 1103, and then transfers that image to the graphic processor 1110 to convert scan image data into display image data. The following processes are mainly executed by the graphic processor 1110 in this step: (1) trimming and addition of margins of image data to fit an output paper size; (2) rotation processing of image data in correspondence with a print direction; (3) variable-magnification processing to fit the size of the display area (resolution conversion processing); and (4) color conversion processing for converting image data onto an RGB color space suited to a display color space of the liquid crystal panel.

In step S627, the CPU 1101 transmits converted image data of respective pages to the CPU 3101. On the other hand, in step S607, the CPU 3101 receives the image data. Subsequently, in step S608, the CPU 3101 composites the received images as thumbnail images for respective print pages to be printed to the preview screen, and displays the preview screen 720. The preview screen 720 is included in the print setting screen. In this case, the CPU 3101 overwrites settings such as staple positions, which are not reflected to the image data, on the image data on the RAM 3108, thus displaying these settings. In this way, a desired display screen can be obtained without changing the image data.

In step S609, the CPU 3101 accepts a user input to the preview screen 720, and executes operation and setting processes. At this time, in step S609, the CPU 3101 further updates the image attribute/print setting files according to the user settings. Since the operation processing executed in step S609 is a characteristic feature of the present invention, it will be described in detail later. If pressing of the print start key 728 or cancel key 727 by the user is detected in step S609, the CPU 3101 ends the preview screen display operation, and the process advances to step S610.

The CPU 3101 determines in step S610 whether or not step S609 ends in response to pressing of the cancel key 727. If the cancel key 727 is pressed in step S610, the CPU 3101 cancels execution of the copy job, thus ending the processing.

On the other hand, if the cancel key 727 is not pressed in step S610, that is, if the print start key 728 is pressed, the process advances to step S611. In step S611, the CPU 3101 transmits the updated image attribute/print setting files to the CPU 1101. In step S628, the CPU 1101 receives the updated image attribute/print setting files, and saves the files to overwrite them on the original files saved in the HDD 1400. In this manner, when the print settings are changed on the preview screen in step S609, these settings can be reflected to the print processing. Subsequently, in step S612, the CPU 3101 transmits a print start instruction to the CPU 1101.

Upon reception of the print start instruction, the CPU 1101 executes print processing in step S629. The print processing executed in this step is that described using the flowchart shown in FIG. 5. Upon completion of the print processing, the CPU 1101 transmits a print end notification to the CPU 3101 in step S630. In step S613, the CPU 3101 receives the print end notification, and ends the copy job.

<Operation on Preview Screen>

User operations accepted on the preview screen 720 shown in FIG. 7 will be described below with reference to FIGS. 9 to 12. FIG. 9 shows screens 900, 910, and 920 displayed when the user rotates the input display panel 3000 while the preview screen 720 is displayed. When the user rotates the input display panel 3000 clockwise through 90°, counterclockwise through 90°, and through 180° on a plane including the preview screen 720, the screens 900, 910, and 920 are respectively displayed. As shown in FIG. 9, the rotation of the input display panel 3000 indicates that on the plane including the display screen of the input display panel 3000.

The CPU 3101 monitors the output from the orientation detection sensor 3117, and displays screens rotated clockwise through 90°, counterclockwise through 90°, and through 180° in case of the screens 900, 910, and 920, so that they can be observed in the same direction when viewed from the user. Note that the orientation detection sensor 3117 can detect a tilt angle continuously (in an analog manner). The orientation detection sensor 3117 detects the rotation of the input display panel 3000 in the plane including the preview screen 720 by detecting the tilt direction and tilt angle of the input display panel 3000 in that plane. However, in order to prevent the displayed screen from being excessively changed for the user, according to this embodiment, the screen is displayed in four ways, for example, as those rotated clockwise and counterclockwise through 90°, through 180°, and through 0°. Four different screens, that is, the preview screen 720, and the screens 900, 910, and 920 are displayed.

Figure 10:
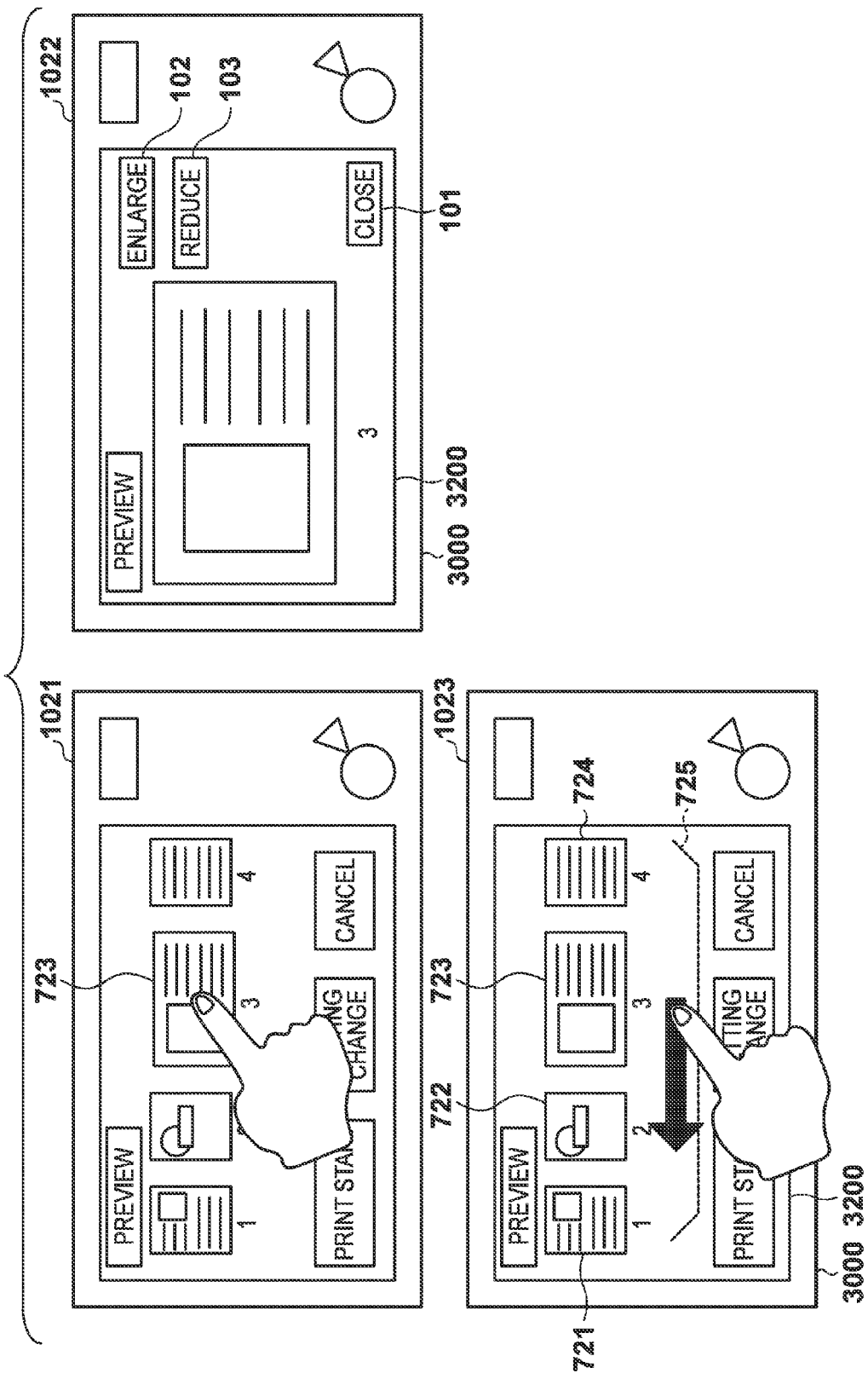
FIG. 10 is a view showing a display example when short press and flick operations are made on the preview screen according to the embodiment.
Figure 11:
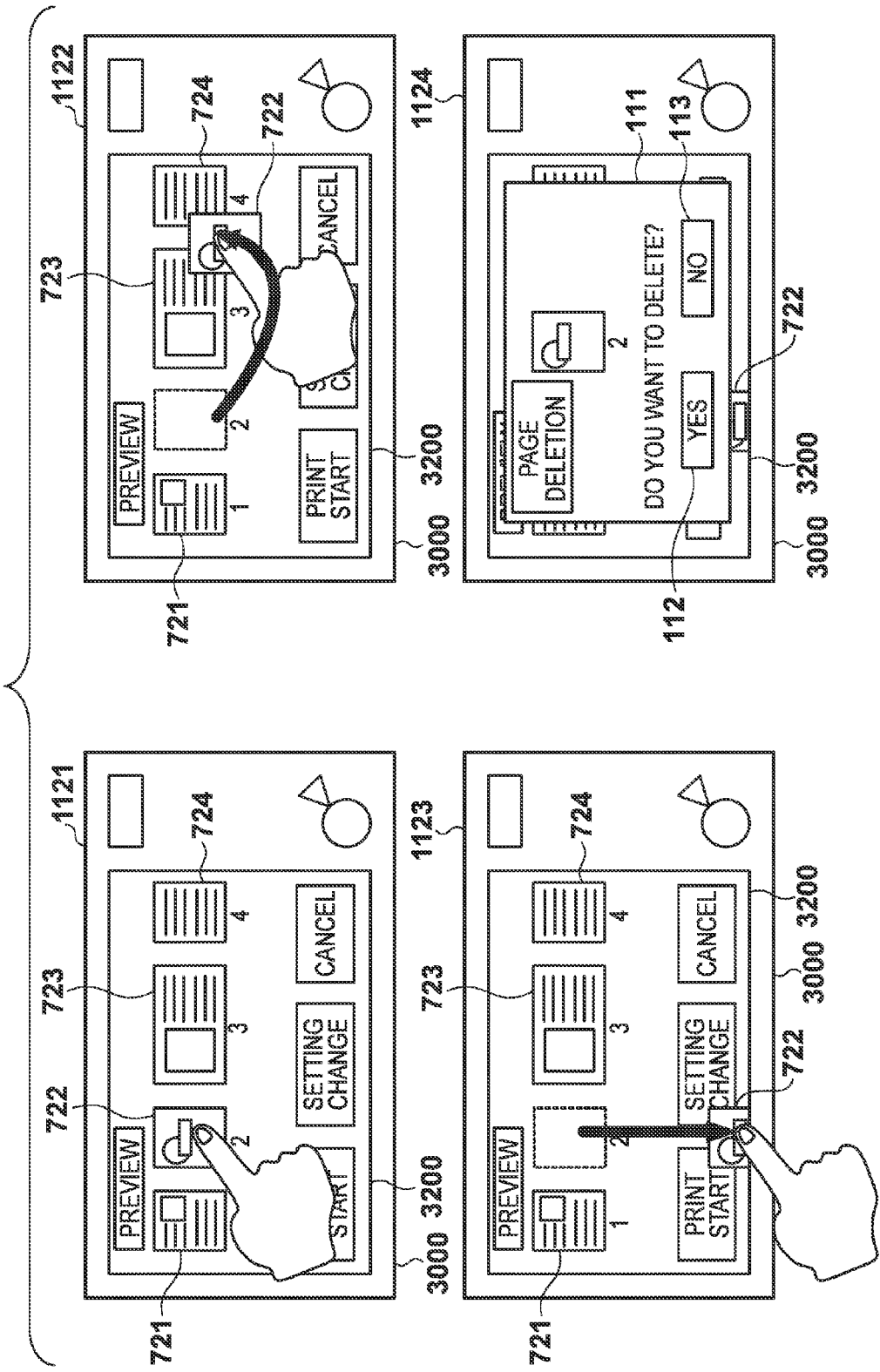
FIG. 11 is a view showing a display example when a long press operation is made on the preview screen according to the embodiment.
Figure 12:
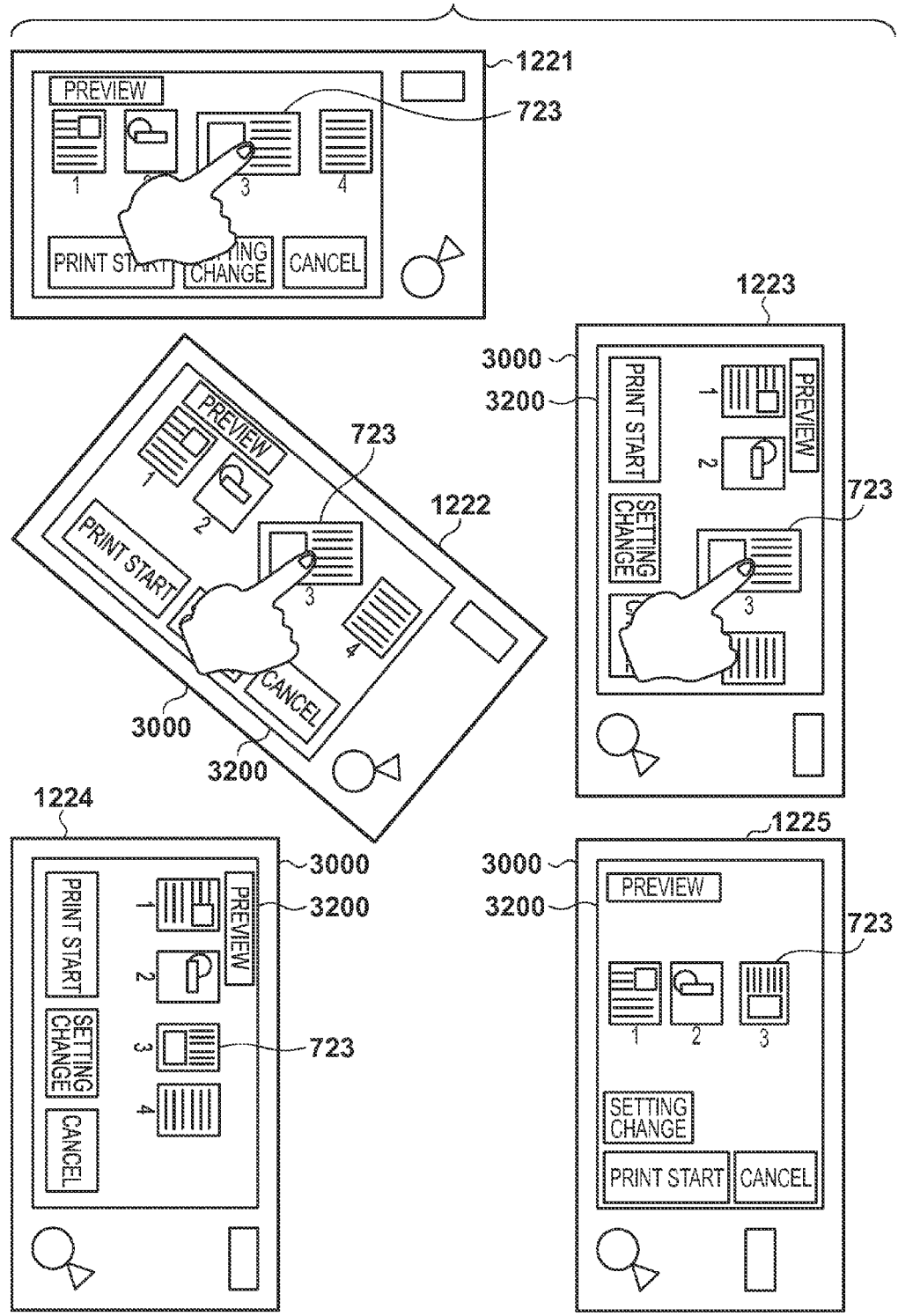
FIG. 12 is a view showing a display example when the input display panel is rotated while making the long press operation on the preview screen according to the embodiment.

FIGS. 10 to 12 show operations when the user makes touch operations on the touch panel 3300 on the preview screen 720. The touch operations include a press operation attained when the user just touches the panel (to be referred to as a short press operation hereinafter), an operation made after the user keeps touching the panel for a predetermined time or longer (for example, about 1 to 2 sec) (to be referred to as a long press operation hereinafter), and an operation attained when the user moves a touched point while keeping touching the panel (to be referred to as a flick operation hereinafter). The CPU 3101 judges a flick operation when a touch position is moved during an interval from the beginning of touching until a long press operation is judged. If a touch position is not moved during an interval from the beginning of touching until a long press operation is judged, the CPU 3101 judges a short or long press operation depending on a time until the touched finger is released. Therefore, processes to be executed can be changed according to flick, short press, and long press operations. Note that if each screen component is artificially expressed as a mechanical button or key by combining display on the LCD 3200 and detection on the touch panel 3300, an operation when the user short- or long-presses that screen component will be referred to as "pressing".

On the preview screen 720, pressing of the aforementioned keys (print start key 728, setting change key 726, and cancel key 727) is accepted even when it is made by either the short or long press operation. When the user makes a short press operation on a displayed preview image, as indicated by a state 1021, a short-pressed page is displayed in an enlarged scale, as indicated by a state 1022. When the user presses an enlarge button 102 or reduce button 103 on the state 1022, the CPU 3101 enlarges/reduces the displayed image. When the user presses a close button 101, the CPU 3101 clears the enlarged display screen, and displays a screen at a normal reduction factor, that is, the preview screen 720 again.

FIG. 10 shows states when the user makes a short press operation and flick operation of a displayed image. When a leftward or rightward flick operation on the preview area 725 is detected, as indicated by a state 1023, the CPU 3101 scrolls the preview display area to interchange the pages to be displayed. The start/end position of the flick operation can be either on the preview image or on an area without any preview image as long as it is located on the preview area 725. As described above, the short press operation and flick operation can be discriminated whether or not the touch position is moved. For this reason, even when the touch start position is located on an identical preview image, the short press operation for enlarged display and the flick operation for a scroll operation can be discriminated from each other.

FIG. 11 shows a state when the user makes a long press operation on a displayed image. When the long press operation is detected, as indicated by a state 1121, the CPU 3101 allows a drag operation for moving a contact point while keeping long-pressing of the long-pressed image. As indicated by a state 1122, when the user makes a drag operation of long-pressed page 2 to a position between other pages (for example, between pages 3 and 4), and releases the contact point (drop), it is set to interchange a print order of the dragged page, and to print that page in the order corresponding to the drop position.

When the user drags and drops page 2 outside the screen, as indicated by a state 1123, it is set to delete dragged page 2 and not to print that page. In case of this page delete operation, a confirmation message asking the user about whether or not he or she really wants to delete that page is displayed. More specifically, when the drag & drop operations outside the screen in the state 1123 are detected, a page deletion confirmation dialog 111 shown in a state 1124 is displayed. When pressing of a "YES" key 112 is detected on the page deletion confirmation dialog 111, that page is deleted, and a preview image of the deleted page is also cleared. When pressing of a "NO" key 113 is detected, the page is not deleted, and the preview image of that page is kept displayed as in an original state. When the user presses the "YES" or "NO" key, the page deletion confirmation dialog 111 is cleared, and the preview screen is displayed again.

When the long press operation of the displayed image is detected, as shown in FIG. 11, the CPU 3101 allows the drag operation, as described above, and also allows a rotation operation of the long-pressed page. FIG. 12 shows states of the page rotation operation. When a long press operation of a displayed image is detected on a state 1221, the CPU 3101 monitors the orientation detection sensor 3117 to detect a tilt of the input display panel 3000. Upon detection of the tilt of the input display panel 3000, as indicated by a state 1222, the CPU 3101 displays only the long-pressed image which is rotated through the same angle in a direction opposite to the detected tilt.

For example, when the tilt of the input display panel 3000 is detected as 45° in a clockwise direction, as indicated by the state 1222, a long-pressed image (page 3) 723 is displayed while being tilted counterclockwise through 45°. In this case, since the center of rotation of the input display panel 3000 is assumed to be a position around the touch position by the long press operation, the pressed position is also set as the center of rotation of the image 723. With this display, only the long-pressed image 723 is displayed without being tilted when viewed from the user.

A state 1223 corresponds to a view when the input display panel 3000 is further tilted clockwise through 90°. The image 723 under operation is displayed while being tilted counterclockwise through 90°. A state 1224 is that when the finger is released from the state 1223. At this time, it is set to rotate the operated image 723 counterclockwise through 90° in correspondence with the displayed image and print the image in that state. Furthermore, an output sheet and magnification factor are changed. For example, the image 723 as an operation target in FIG. 12 is an image of an A3 paper size. When the settings are changed to rotate this image counterclockwise through 90° and to print the rotated image in the state 1223, an image cannot fall within an A3 sheet. Hence, since the image is rotated to that at a portrait position, a maximum sheet for the portrait position of those which can be printed by the printing apparatus 1000 is selected (an A4 sheet is selected in this case). Furthermore, a variable magnification factor is calculated so that the image can fall within the selected sheet (in this case, since the paper size is changed from A3 to A4, a variable magnification factor of about 70% is calculated).

In this way, the print settings are re-calculated and are saved in a print setting file to re-set the settings. The re-set contents are transmitted to the controller board 1100 and are reflected to the print processing, as described in step S611 of the flowchart shown in FIG. 6. After the state 1224 is displayed, since this state corresponds to a state in which the input display panel 3000 is titled clockwise through 90°, the entire preview screen is rotated and displayed, as indicated by a state 1225, as described with reference to FIG. 9. When the display state 1224 is immediately changed to the display state 1225, the screen in the state 1224 may not be easily confirmed by the user. After the state 1224 is displayed for a predetermined time (about 1 to several sec), the tilt of the input display panel 3000 is acquired from the orientation detection sensor 3117 again to display the rotated screen in the state 1225. Therefore, when the user quickly rotates the input display panel 3000 until the entire preview screen is rotated and displayed, the rotated screen is displayed at an angle after that rotation.

<Processing Sequence in Operation on Preview Screen>

The processing sequence in the operations on the preview screen 720 will be described below with reference to the flowcharts shown in FIGS. 8 and 13. The processing to be described below is implemented when the CPU 3101 reads out a control program stored in the FLASH ROM 3107 onto the RAM 3108, and executes the readout program.

Figure 8A:
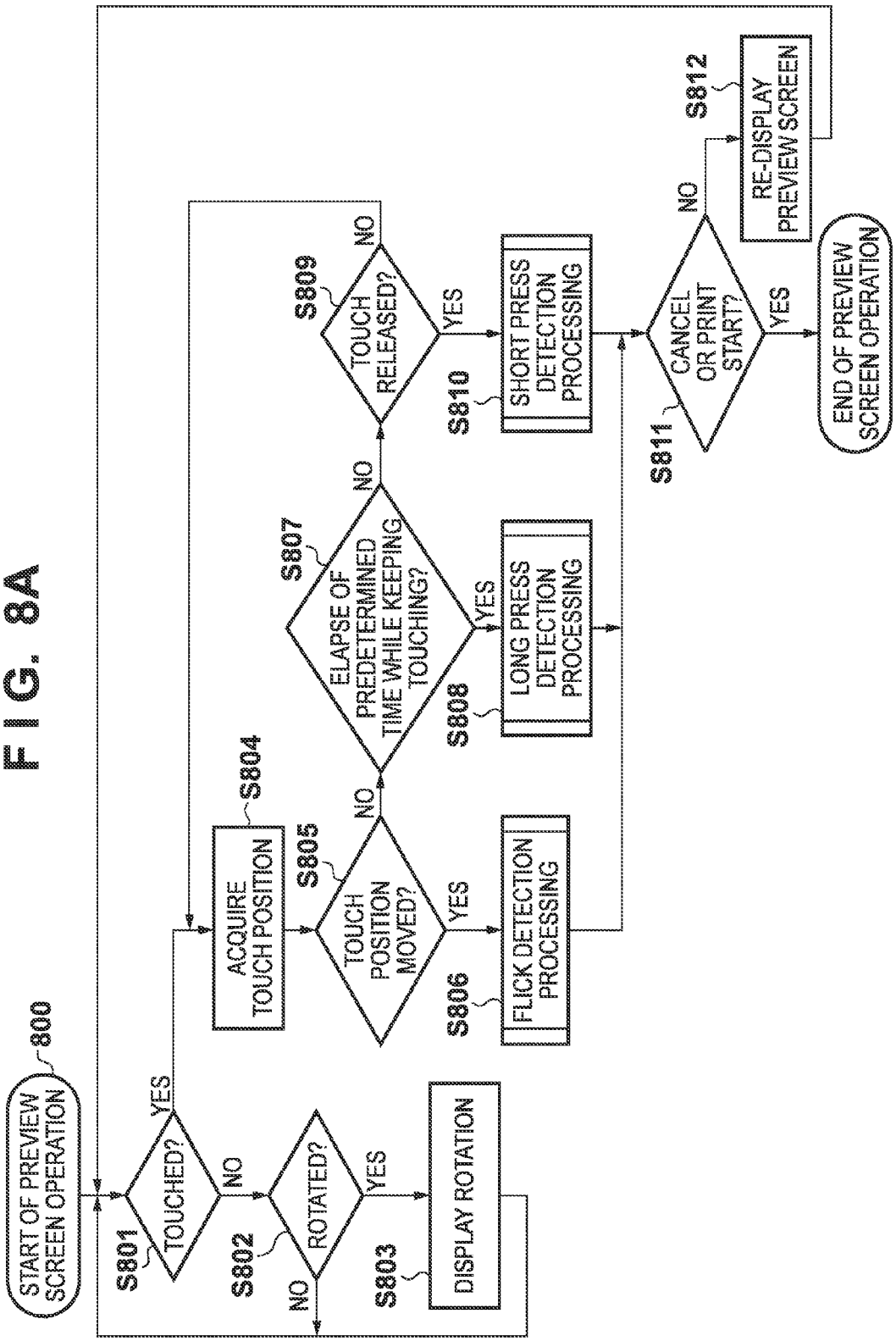

In a flowchart 800 shown in FIG. 8A, when the preview screen is displayed, and an operation is started, the CPU 3101 checks an output of the touch panel 3300 in step S801 to determine whether or not the user touches the touch panel 3300. If the user does not touch, the process advances to step S802, and the CPU 3101 determines the output of the orientation detection sensor 3117 to determine whether or not the input display panel 3000 is rotated from the current display direction. In this case, in order to display the three different screens described using FIG. 9, the rotation angle of the input display panel 3000 is rounded to one of three different angles, that is, 90° in the clockwise and counterclockwise directions and 180°. Various rounding methods are available. This embodiment adopts the following simple method. (1) When the input display panel 3000 is rotated from the current display direction through 150° or more in the clockwise or counterclockwise direction, a rotation angle of 180° is determined. (2) (1) is not applicable, and when the input display panel 3000 is rotated from the current display direction through 60° or more in the counterclockwise (or clockwise) direction, a rotation angle of 90° in the counterclockwise (or clockwise) direction is determined. The above conditions are merely examples and do not limit the present invention.

It is determined that the input display panel 3000 is rotated, the process advances to step S803, and the CPU 3101 rotates the display screen and displays the rotated screen, as shown in FIG. 9. On the other hand, if NO in step S802, the process returns to step S801, and the CPU 3101 determines whether or not the user touches the touch panel 3300 again.

If YES in step S801, that is, if a touch operation on the touch panel 3300 is detected, the process advances to step S804, and the CPU 3101 acquires the touch position on the touch panel from the touch panel 3300. Subsequently, the CPU 3101 determines in step S805 whether or not the user moves the touch position from the acquired touch position while keeping touching the panel.

If NO in step S805, the process advances to step S807, and the CPU 3101 determines whether or not a predetermined time elapses in the touched state. If NO in step S807, the process advances to step S809, and the CPU 3101 determines whether or not the user releases the touched finger. If NO in step S809, the process returns to step S804 to acquire the touch position, and changes in touched state are detected in steps S805, S807, and S809.

On the other hand, if YES in step S805, that is, if the contact point is moved while keeping the touched state, the CPU 3101 judges that a flick operation is made, and the process advances to step S806. In step S806, the CPU 3101 executes flick operation detection processing. Details of the flick operation detection processing in step S806 will be described later using a flowchart 820 shown in FIG. 8B.

If YES in step S807, that is, if the contact point is not moved while keeping the touched state, and a predetermined time has further elapsed, the CPU 3101 judges that a long press operation is made. Then, in step S808, the CPU 3101 executes processing upon detection of the long press operation. Details of the long press detection processing in step S808 will be described later using the flowchart shown in FIG. 13.

If YES in step S809, that is, if the contact point upon touching is not moved, and the touched finger is released within the predetermined time, the CPU 3101 judges that a short press operation is made. Then, in step S810, the CPU 3101 executes processing upon detection of the short press operation. Details of the short press detection processing in step S810 will be described later using a flowchart 840 shown in FIG. 8B.

Upon completion of the operation detection processing in step S806, S808, or S810, the process advances to step S811. In the short press detection processing in step S810 or the long press detection processing in step S808, pressing of the cancel key 727 or print start key 728 is detected in some cases. The CPU 3101 determines in step S811 whether or not either of these two operation is made. If NO in step S811, the process advances to step S812, and the CPU 3101 displays the preview screen again. The process returns to step S801, and the CPU 3101 waits for the next touch operation. On the other hand, if YES in step S811, the CPU 3101 ends the preview screen display operation.

<Flick Operation Detection Processing>

The processing executed in step S806 upon detection of the flick operation will be described below with reference to the flowchart 820 shown in FIG. 8B. The CPU 3101 determines in step S821 whether or not the start position of the flick operation is located within the range of the area 725 on the preview screen 720. If NO in step S821, the flick operation processing ends without any processing. On the other hand, if YES in step S821, the process advances to step S822, and the CPU 3101 calculates a moving direction and amount of the touch position from the flick operation start position and the current touch position. Subsequently, in step S823, the CPU 3101 calculates a display scroll amount based on the calculated moving direction and amount, and executes scroll processing of preview images. Thus, the processing upon detection of the flick operation ends.

<Short Press Detection Processing>

The processing executed in step S810 upon detection of the short press operation will be described below with reference to the flowchart 840 shown in FIG. 8B. The CPU 3101 determines in step S841 whether or not the user presses the cancel key 727. If the user does not press the cancel key 727, the process advances to step S842, and the CPU 3101 determines whether or not the user presses the print start key 728. If the user does not press the print start key 728, the process advances to step S843, and the CPU 3101 determines whether or not the user presses the setting change key 726. If the user does not press the setting change key 726, the process advances to step S844, and the CPU 3101 determines whether or not the user presses any of images displayed on the preview screen. If NO in all of steps S841 to S844, the CPU 3101 judges that the detected short press operation is not a valid input, and ends the short press detection processing without any processing.

If YES in step S841, since pressing of the cancel key 727 is detected, the process advances to step S845, and the CPU 3101 executes cancel processing of the copy job. If YES in step S842, since pressing of the print start key 728 is detected, the process advances to step S846, and the CPU 3101 starts print processing. If YES in step S843, since pressing of the setting change key 726 is detected, the process advances to step S847, and the CPU 3101 displays the setting change screen 730. Furthermore, in step S848, the CPU 3101 accepts input operations to the setting change screen 730. Upon detection of pressing of the close key 731, the CPU 3101 ends the input operation acceptance, and ends the short press operation detection processing.

If YES in step S844, since pressing of an image is detected, the process advances to step S849, and the CPU 3101 displays the enlarged display screen 1022. Furthermore, in step S850, the CPU 3101 accepts input operations to the enlarged display screen 1022. Upon detection of pressing of the close key 101, the CPU 3101 ends the input operation acceptance, and ends the short press operation detection processing.

<Long Press Detection Processing>

The processing executed in step S808 upon detection of the long press operation will be described below with reference to the flowchart shown in FIG. 13. This processing is especially a characteristic feature of the present invention.

The CPU 3101 determines in step S1311 whether or not the start position of the long press operation is located on a preview image. If YES in step S1311, the process advances to processes of steps S1312 to S1317, that is, rotation display and drag display processes of the preview image. On the other hand, if NO in step S1311, the process advances to step S1318, and the CPU 3101 waits until the touched finger is released (cleared).

In step S1312, the CPU 3101 reads out the output of the orientation detection sensor 3117, and determines whether or not the input display panel 3000 is rotated. If YES in step S1312, the process advances to step S1313, and the CPU 3101 calculates a rotation angle of the input display panel 3000 from the readout output of the orientation detection sensor 3117. Subsequently, in step S1314, the CPU 3101 rotates the long-pressed image in a direction opposite to the rotation direction of the input display panel 3000 through the rotation angle calculated in step S1313, and displays the rotated image, as described in the states 1222 and 1223. Thus, according to this embodiment, a relative inexpensive device which can detect only a single point can be adopted as the touch panel 3300 without adopting a relatively expensive device which allows multi-point pressing. Furthermore, the user can rotate a thumbnail on the preview screen by an intuitive operation.

After completion of the processing in step S1314, or if NO in step S1312, the process advances to step S1315, and the CPU 3101 reads out the output (detection result) of the touch panel 3300 and determines whether or not the touch position has been moved. If YES in step S1315, the process advances to step S1316, and the CPU 3101 calculates a position after movement of the touch position from the output of the touch panel 3300. Subsequently, in step S1317, the CPU 3101 renders the long-pressed display image at the moved position again. With the processes of steps S1316 and S1317, the drag display processing of an image can be attained.

After completion of the processing in step S1317, or if NO in step S1311 or S1315, the process advances to step S1318, and the CPU 3101 determines based on the output of the touch panel 3300 whether or not the touch operation is released. If NO in step S1318, that is, if the long press operation is continued, the process returns to step S1311 to continue the rotation display and drag display processes of an image. Note that as can be seen from the description of steps S1311 to S1318, even when the input display panel 3000 is rotated during the long press operation, the entire preview screen shown in FIG. 9 is not rotated and displayed, but only the long-pressed image is rotated and displayed. Thus, the input display panel 3000 can present to the user that the rotation operation of the pressed image is underway.

If YES in step S1318, that is, if the touched finger is released from the touch panel 3300, the process advances to those in step S1319 and subsequent steps. The CPU 3101 determines in step S1319 whether or not the touch position when the long press operation was started is located on a display image. If YES in step S1319, the process advances to step S1320, and the CPU 3101 determines whether or not the panel is rotated through a predetermined angle or more. The predetermined angle in this case is a value which allows to recognize that the input display panel 3000 is rotated through 90° or more in the clockwise or counterclockwise direction, and is, for example, 45° in the clockwise or counterclockwise direction.

If YES in step S1320, the process advances to step S1321, and the CPU 3101 calculates the rotation angle of the input display panel 3000. The rotation angle in this case is calculated by the same calculation method as in step S802 described above, and is rounded to one of three different rotation angles, that is, 90° in the clockwise and counterclockwise directions, and 180°.

In step S1322, the CPU 3101 makes rotation print settings according to the calculated rotation angle. A rotation print angle is set in a direction opposite to that of the rotation angle of the clockwise or counterclockwise direction of the input display panel 3000. That is, ●when the input display panel 3000 is rotated counterclockwise through 90°, a rotation print angle of 90° in the clockwise direction is set; ●when the input display panel 3000 is rotated clockwise through 90°, a rotation print angle of 90° in the counterclockwise direction is set; or ●when the input display panel 3000 is rotated through 180°, a rotation print angle of 180° is set. After the rotation print angle is decided, an output sheet is decided, and a variable magnification factor is calculated so that the image can fall within the decided sheet, as has been described above using FIG. 12. The image attribute/print setting file acquired from the printing apparatus 1000 is rewritten by these re-calculated settings. The rewritten settings are reflected to the print processing, as has been described above using the flowchart shown in FIG. 6.

In step S1323, the CPU 3101 changes the direction and size of the display image based on the settings in step S1322, and re-displays the preview screen in a non-rotated direction, as indicated by the state 1224. Then, as described above, the CPU 3101 waits while keeping displaying the screen in the state 1224 until a predetermined time elapses in step S1324, so as to allow the user to confirm the screen in the state 1224. In step S1325, the CPU 3101 calculates the rotation angle of the input display panel from the current display direction by the same calculation method as in step S802, and rotates and displays the entire preview screen, as indicated by the state 1225. In this way, only the long-pressed image is displayed to emphasize addition of the rotation print settings, while displaying the entire preview screen before rotation until the predetermined time elapses. After that, when the predetermined time has elapsed, the rotated preview screen is displayed, thus attaining both understandability of the setting contents and viewability of the display.

If the rotation angle of the input display panel 3000 is less than the predetermined value in step S1320, and it is not considered that the input display panel 3000 is rotated through 90° or more in the clockwise or counterclockwise direction, the CPU 3101 determines in step S1326 whether or not the touch position has been moved by a predetermined value or more between the start and end timings of the long press operation. The predetermined value in this case is used to prevent operation errors of the user, and can assume an arbitrary value. If YES in step S1326, since the drag & drop operations for dragging an image by the long press operation, and then dropping that image have been executed, corresponding processes are executed in step S1327 and subsequent steps.

In step S1327, the CPU 3101 calculates a position after movement to acquire a dropped position. Subsequently, in step S1328, the CPU 3101 executes the page order interchange (print order change) processing in the state 1122 or the page delete processing in the state 1123 according to the dropped position. In step S1329, the CPU 3101 re-displays the preview screen, thus ending the long press detection processing.

Note that when the user rotates the input display panel while keeping touching the panel during the long press operation, since it is not guaranteed to accurate rotate the panel to have the touch position as the center, the touch position is likely to be moved during the rotation. Hence, whether or not the panel has been rotated is determined in step S1320 prior to movement of the touch position, thus allowing to appropriately judging the rotation while avoiding the influence of movement of the touch position upon rotation. After it is judged that the panel has not been rotated, since movement of the touch position is judged in step S1326, the drag & drop operations can be detected.

If NO in step S1319 (if the user presses a position other than an image), or if NO in both steps S1320 and S1326, the process advances to step S1330, and the CPU 3101 determines whether or not the moving amount of the touch position is smaller than a predetermined value. The predetermined value in this case can be the same as that in step S1326. However, in this case, since whether or not the touch position stands still is to be detected, it is proper that the predetermined value is smaller than that in step S1326.

If YES in step S1330, the process advances to step S1331, and the CPU 3101 executes the same processing as that upon detection of the short press operation, that is, the processing of the flowchart 840. After completion of the processing in step S1331, or if NO in step S1330, the processing upon detection of the long press operation ends.

As described above, according to this embodiment, when the user makes the long press operation on the preview screen, he or she can make operations of rotation settings, page insertion/deletion, and the same key input processing as that of the short press operation. Especially, as the rotation settings, since the touch operation on the touch panel 3300 and the rotation of the input display panel 3000 itself are detected at the same time, an intuitive operation for the user can be realized.

As described above, according to this embodiment, since rotation print settings can be independently and intuitively made for each page in a print instruction from the input display panel including the tilt sensor to the printing apparatus, the operability of the user can be enhanced. Furthermore, since the rotation settings are made using the touch panel which detects one contact point in place of any special touch panel which detects a plurality of contact points, the system of this embodiment is also advantageous in terms of low cost.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-289894 filed on Dec. 28, 2011, which is hereby incorporated by reference herein in its entirety.

What is claimed is:

1. An input display apparatus configured to communicate with a printing apparatus, said apparatus further comprising:
   a display unit configured to display a print setting screen;
   a touch detection unit configured to detect a touch by an operator on the print setting screen displayed on the display unit;
   an orientation detection unit configured to detect an orientation of an apparatus body,
   a position determination unit configured to determine which screen components displayed on the print setting screen is touched by the operator based on a detected result by the touch detection unit;
   an operation determination unit configured to determine a type of an operation from the touch by the operator detected by the touch detection unit;
   a rotation determination unit configured to determine, based on the orientation of the input display apparatus detected by the orientation detection unit, whether or not said input display apparatus has been rotated on a plane including a display screen of the display unit; and
   a display control unit configured to rotate, in a case that said operation determination unit determines that the operation is a long press operation, and said rotation determination unit determines that said input display apparatus has been rotated, the touched screen component determined by said position determination unit in a direction opposite to a rotation direction of said input display apparatus and display the rotated screen component.

2. The apparatus according to claim 1, further comprising a calculation unit configured to calculate a rotation angle of the rotation of said input display apparatus on the plane including the display screen of the display unit from the orientation detected by the orientation detection unit,
wherein said display control unit rotates the touched screen component on the print setting screen by the rotation angle calculated by said calculation unit in the direction opposite to the rotation direction of said input display apparatus.

3. The apparatus according to claim 1, further comprising a movement determination unit configured to determine from a detection result of the touch detection unit whether or not a touch position has been moved, after said operation determination unit determines the long press operation,
wherein in a case that said movement determination unit determines that the touch position has been moved, said display control unit moves the touched screen component on the print setting screen to the moved touch position.

4. The apparatus according to claim 1, wherein the screen component is a thumbnail for each print page displayed in a case that print processing is executed in the printing apparatus, and
said apparatus further comprises a print setting unit configured to set, in a case that the touch detection unit detects a release of the touch by the operator, and in a case that said display control unit has rotated the thumbnail, to execute a rotation print operation of a print page corresponding to the rotated thumbnail.

5. The apparatus according to claim 4, wherein in a case that said print setting unit sets the rotation print operation, and after an elapse of a predetermined time since the touch detection unit detects the release of the touch by the operator, said display control unit rotates the print setting screen in the rotation direction of said input display apparatus.

6. The apparatus according to claim 3, wherein the screen component is a thumbnail for each print page displayed in a case that print processing is executed in the printing apparatus, and
said apparatus further comprises a print setting unit configured to set, in a case that the touch detection unit detects a release of the touch by the operator, and in a case that said display control unit has moved the thumbnail, to change a print order of a print page corresponding to the moved thumbnail or to delete the print page according to the moved position.

7. The apparatus according to claim 1, wherein said input display apparatus and the printing apparatus communicate with each other via a wireless communication.

8. The apparatus according to claim 1, wherein said operation determination unit determine whether an operation from the touch by the operator detected by the touch detection unit is a short press operation, a long press operation, or a flick operation corresponding to changes of touch positions.

9. A printing apparatus comprising:
a connector configured to connect an input display apparatus of claim 1; and
a power supply controller configured to supply a power to the input display apparatus connected via said connector.

10. A control method of an input display apparatus, which comprises a display unit configured to display a print setting screen, a touch detection unit configured to detect a touch by an operator on the print setting screen displayed on the display unit, and an orientation detection unit configured to detect an orientation of an apparatus body, and is configured to communicate with a printing apparatus, the method comprising:
determining, by the input display apparatus, which screen components displayed on the print setting screen is touched by the operator based on a detected result in the touch detection step;
determining, by the input display apparatus, a type of an operation from the touch by the operator detected by the touch detection unit;
determining, by the input display apparatus, based on the orientation of the input display apparatus detected by the orientation detection unit, whether or not the input display apparatus has been rotated on a plane including a display screen of the display unit; and
rotating, by the input display apparatus, in a case that it is determined in the determining by the operation determination unit that the operation is a long press operation, and it is determined in the determining by rotation determination unit that the input display apparatus has been rotated, the touched screen component determined in the determining by the position determination unit in a direction opposite to a rotation direction of the input display apparatus; and
displaying the rotated screen component.

11. A non-transitory computer-readable storage medium storing a computer program for causing a computer to execute respective steps in a control method of an input display apparatus of claim 10.

12. An input display apparatus comprising:
a display unit;
a touch detection unit configured to detect a touch by an operator on a screen displayed on the display unit;
an orientation detection unit configured to detect an orientation of the input display apparatus;
a specify unit configured to specify a screen component selected by the operator on the screen displayed on the display unit based on a detected result by the touch detection unit;
a rotation determination unit configured to determine, based on the orientation of the input display apparatus detected by the orientation detection unit, whether or not the input display apparatus has been rotated on a plane including a display screen of the display unit; and
a display control unit configured to display, in a case that the rotation determination unit determines that the input display apparatus has been rotated, the screen component specified by the specify unit such that the specified screen component is rotated in a direction opposite to a rotation direction of the input display apparatus.

13. The apparatus according to claim 12, further comprising a calculation unit configured to calculate a rotation angle of the rotation of the input display apparatus on the plane including the display screen of the display unit from the orientation detected by the orientation detection unit,
wherein the display control unit displays the screen component specified by the specify unit such that the specified screen component is rotated, by the rotation angle calculated by the calculation unit in the direction opposite to the rotation direction of the input display apparatus.

14. The apparatus according claim 12, wherein the display control unit displays, after an elapse of a predetermined time since the touch detection unit detects the release of the touch by the operator, the screen such that the screen is rotated based on the rotation direction of the input display apparatus.

15. The apparatus according to claim 12, wherein a plurality of screen components are displayed on the screen, and
the display control unit displays, in a case that the rotation determination unit determines that the input display apparatus has been rotated, the screen component specified by the specify unit such that the specified screen component is rotated in a direction opposite to a rotation direction of the input display apparatus, and displays, without rotating, screen components other than the screen component specified by the specify unit.

16. The apparatus according to claim 12, wherein the screen component is a thumbnail of an image to be output.

17. A control method of an input display apparatus, which comprises a display unit, a touch detection unit configured to detect a touch by an operator on a screen displayed on the display unit, and an orientation detection unit configured to detect an orientation of the input display apparatus, comprising:

specifying, by the input display apparatus, a screen component selected by the operator on the screen displayed on the display unit based on a detected result by the touch detection unit;
determining, by the input display apparatus, based on the orientation of the input display apparatus detected by the orientation detection unit, whether or not the input display apparatus has been rotated on a plane including a display screen of the display unit; and
rotating and displaying, by the input display apparatus, in a case that it is determined that the input display apparatus has been rotated, the specified screen component such that the specified screen component is rotated in a direction opposite to a rotation direction of the input display apparatus.

18. A non-transitory computer-readable storage medium storing a computer program for causing a computer to execute respective steps in a control method of an input display apparatus of claim 17.

* * * * *